United States Patent
Badiu et al.

(10) Patent No.: US 9,948,415 B2
(45) Date of Patent: Apr. 17, 2018

(54) METHOD OF PROCESSING A PLURALITY OF SIGNALS AND SIGNAL PROCESSING DEVICE

(71) Applicant: Intel IP Corporation, Santa Clara, CA (US)

(72) Inventors: Mihai-Alin Badiu, Aalborg (DK); Guillaume Monghal, Aalborg (DK); Bernard Fleury, Aalborg (DK); Christian Rom, Aalborg (DK)

(73) Assignee: INTEL IP CORPORATION, Santa Clara, CA (US)

( * ) Notice: Subject to any disclaimer, the term of this patent is extended or adjusted under 35 U.S.C. 154(b) by 108 days.

(21) Appl. No.: 14/670,465

(22) Filed: Mar. 27, 2015

(65) Prior Publication Data
US 2016/0285571 A1    Sep. 29, 2016

(51) Int. Cl.
*H04L 5/00* (2006.01)
*H04B 17/391* (2015.01)
*H04L 25/02* (2006.01)
*H04B 17/309* (2015.01)

(52) U.S. Cl.
CPC ......... *H04B 17/391* (2015.01); *H04B 17/309* (2015.01); *H04L 5/0007* (2013.01); *H04L 25/0204* (2013.01); *H04L 25/0224* (2013.01); *H04L 25/0242* (2013.01)

(58) Field of Classification Search
CPC .................................................... H04B 17/391
See application file for complete search history.

(56) References Cited

U.S. PATENT DOCUMENTS

| | | | | |
|---|---|---|---|---|
| 7,245,677 B1 * | 7/2007 | Pare, Jr. | ................ | H04L 25/022 375/326 |
| 7,738,538 B1 * | 6/2010 | Tung | ................... | H04L 25/0224 370/477 |
| 7,856,068 B1 * | 12/2010 | Tung | ................... | H04L 25/0232 370/334 |

(Continued)

FOREIGN PATENT DOCUMENTS

| | | |
|---|---|---|
| DE | 102014008347 A1 | 12/2015 |
| EP | 2429138 A1 * | 3/2012 ......... H04L 25/0204 |

(Continued)

OTHER PUBLICATIONS

Kirkelund et al, "Variational Message-Passing for Joint Channel Estimation and Decoding in MIMO-OFDM", IEEE GLOBECOM 2010, Dec. 2010, 6 pages.

(Continued)

*Primary Examiner* — Parth Patel
(74) *Attorney, Agent, or Firm* — Viering, Jentschura & Partner mbB

(57) ABSTRACT

A method for processing a plurality of signals may include receiving one or more observations characterizing a wireless channel, performing a channel estimation to determine a probabilistic channel model for the wireless channel, and processing the plurality of signals using the probabilistic channel model. The channel estimation may include numerically updating one or more multipath gain estimates and one or more multipath delay estimates based on the one or more received observations and a probability distribution associated with the probabilistic channel model.

18 Claims, 7 Drawing Sheets

(56) References Cited

U.S. PATENT DOCUMENTS

| | | | | |
|---|---|---|---|---|
| 8,149,905 | B1* | 4/2012 | Cheng | H04B 3/46 375/224 |
| 8,285,719 | B1* | 10/2012 | Long | G06N 7/005 707/737 |
| 8,451,919 | B2* | 5/2013 | Matsumura | H04L 25/022 375/260 |
| 8,514,954 | B1* | 8/2013 | Yu | H04L 5/0048 375/260 |
| 9,660,677 | B2* | 5/2017 | Murrin | H04B 1/10 |
| 2002/0051433 | A1* | 5/2002 | Affes | H04B 1/71052 370/335 |
| 2006/0104254 | A1* | 5/2006 | Shin | H04L 27/2657 370/343 |
| 2006/0148429 | A1* | 7/2006 | Inogai | H04B 17/0087 455/115.1 |
| 2006/0234662 | A1* | 10/2006 | Diloisy | H04B 7/0845 455/273 |
| 2007/0019769 | A1* | 1/2007 | Green | H04W 24/00 375/360 |
| 2008/0299896 | A1* | 12/2008 | Mohebbi | H04B 7/0802 455/8 |
| 2009/0059961 | A1* | 3/2009 | Shukla | H04L 5/0048 370/500 |
| 2009/0074038 | A1* | 3/2009 | Lentmaier | G01S 19/37 375/148 |
| 2009/0112586 | A1 | 4/2009 | Williams | |
| 2010/0093300 | A1* | 4/2010 | Nuutinen | H04B 17/3912 455/296 |
| 2011/0002232 | A1* | 1/2011 | Niewczas | H04B 1/7085 370/252 |
| 2011/0075708 | A1* | 3/2011 | Hahm | H04B 1/71072 375/144 |
| 2011/0314039 | A1* | 12/2011 | Zheleva | G06F 17/30035 707/767 |
| 2012/0287803 | A1* | 11/2012 | Niu | H04L 25/0204 370/252 |
| 2013/0029608 | A1* | 1/2013 | Kuo | H04W 24/00 455/67.11 |
| 2013/0051445 | A1* | 2/2013 | Liu | H04L 25/0204 375/224 |
| 2013/0210474 | A1* | 8/2013 | Kyosti | H04B 17/0087 455/517 |
| 2014/0098704 | A1* | 4/2014 | Wang | H04L 25/0212 370/254 |
| 2014/0154995 | A1* | 6/2014 | Kennedy | H04W 24/06 455/67.11 |
| 2014/0187427 | A1* | 7/2014 | Macready | G06N 99/002 505/170 |
| 2014/0219123 | A1* | 8/2014 | Diebenbusch | H04W 24/08 370/252 |
| 2015/0003542 | A1* | 1/2015 | Barbu | H04L 25/0218 375/260 |
| 2015/0104031 | A1* | 4/2015 | Park | G10K 11/1788 381/71.6 |
| 2015/0185312 | A1* | 7/2015 | Gaubitch | G01S 5/18 367/13 |
| 2015/0280942 | A1* | 10/2015 | Ahmed | H04L 25/0218 375/130 |
| 2015/0312678 | A1* | 10/2015 | Kruger | H04H 20/89 381/303 |
| 2016/0233998 | A1* | 8/2016 | Sun | H04L 5/0051 |

FOREIGN PATENT DOCUMENTS

| | | |
|---|---|---|
| EP | 2627015 A2 | 8/2013 |
| KR | 10-2006-0098679 A | 9/2006 |
| TW | I291817 B | 12/2007 |
| TW | 201110624 A | 3/2011 |
| WO | 2016022157 A1 | 2/2016 |

OTHER PUBLICATIONS

Del Amo et al., "Iterative Joint Estimation Procedure for Channel and Frequency Offset in Multi-Antenna OFDM Systems With an Insufficient Cyclic Prefix", IEEE Transactions on Vehicular Technology, vol. 62, No. 8, Oct. 2013,10 pages.

Riegler et al., "Merging belief propagation and the mean field approximation: A free energy approach", IEEE Transaction on Information Theory, Jan. 2013, 16 pages, vol. 59, No. 1.

Xing et al., "A Generalized Mean Field Algorithm for Variational Inference in Exponential Families", 19th Conference on Uncertainty in Artificial Intelligence, Oct. 2012, 9 pages.

Kyosti et al., "IST-4-027756 Winner II D1.1.2 V1.0 Winner II Channel Models Part II—Radio Channel Measurement and Analysis Results" Information Society Technologies, Sep. 2007, 206 pages.

Li et al., "Robust channel estimation for OFDM systems with rapid dispersive fading channels", IEEE Transactions on Communications, Jul. 1998, 14 pages, vol. 46, No. 7.

Office Action received for corresponding TW Patent Application No. 104112403 dated May 18, 2016, 7 pages of office action and 11 pages of English translation.

Berger et al., "Sparse channel estimation for OFDM: Over-complete dictionaries and super-resolution," SPAWC, 2009, 5 pages.

Prasad and Murthy, "Bayesian learning for joint sparse OFDM channel estimation and data detection," IEEE GLOBECOM, 2010, 6 pages.

Pedersen et al., "Application of Bayesian hierarchical prior modeling to sparse channel estimation," ICC, 2012, 6 pages.

Shutin et al., "Fast adaptive variational sparse Bayesian learning with automatic relevance determination," ICASSP, 2011, pp. 2180-pp. 2183.

European Search Report for the corresponding European Patent Application No. 16 15 4721, dated Jul. 29, 2016, 7 pages of Search Report.

Taiwanese Office Action based on Application No. 105105514 (8 Pages and 9 pages of English translation) dated May 22, 2017 (Reference Purpose Only).

\* cited by examiner

METHOD OF PROCESSING A PLURALITY OF SIGNALS AND SIGNAL PROCESSING DEVICE

TECHNICAL FIELD

Various embodiments relate generally to calculating an estimated channel impulse response calculating estimated channel weights, multipath delays, and noise precision, where the multipath delays are computed in a continuous domain.

BACKGROUND

Channel estimation plays an important role in accurate demodulation of symbols received at Orthogonal Frequency Division Multiplexing (OFDM) receivers. OFDM receivers may obtain an estimate of a physical channel, which may be characterized by the channel impulse response (CIR). The channel estimate may reflect distinct channel characteristics such as Doppler shift, path-loss, phase shifts, multipath propagation, noise and other interference, etc.

Signals transmitted over such wireless channels may inherently be modified and/or altered as a result of transmission over the corresponding wireless channel, and accordingly received symbols may be corrupted. Accurate channel estimation at an OFDM receiver may allow the OFDM receiver to inverse any such corruption of received symbols, thereby leading to improved reception performance.

Conventional Long Term Evolution (LTE) networks as specified by the $3^{rd}$ Generation Partnership Project (3GPP) specify utilization of OFDM for downlink transmissions from base stations to connected mobile terminals. Mobile terminals operating on LTE networks therefore attempt to obtain channel estimates for active downlink channels in order to accurately estimate demodulate received symbols by compensating for channel effects.

Precise channel estimates may in effect lead to improved demodulation of received signals. In order to facilitate effective channel estimation, a base station may transmit pilot (or reference) symbols to be received by mobile terminals. The pilot symbols may be predetermined, and accordingly a mobile terminal may analyze a received pilot symbol in order to determine any differences impressed on the symbol by the wireless channel. The mobile terminal may then obtain a channel estimate by comparing the received pilot symbol to the predetermined pilot symbols, and may compensate for channel effects based on the channel estimate.

Channel estimates may therefore be useful in approximating the effects a wireless channel will have on a transmitted wireless signal. In addition to potential benefits involved during real-time operation of a wireless communication network, accurate channel estimates may be valuable in offline testing and analysis of wireless networks.

One such example is in Virtual Drive Testing (VDT), which involves methods for replaying drive tests in a controlled lab environment. VDT may act as a substitute for physical drive tests, which involve taking physical measurements of wireless signals at various locations around a physical base station in order to evaluate network performance. VDT may thus provide a cost-effective alternative to physical drive tests, as VDT may be performed in a laboratory environment as opposed to field testing. VDT may also assist in decreasing time to market for new equipment, as debugging in a lab environment may be greatly simplified compared to debugging during field testing. Finally, VDT may help to optimize field performance.

In order to act as a suitable substitute for field testing, VDT must be able to "replay" a wireless channel with a high degree of accuracy. The wireless channel may thus be recreated in a lab environment such as an Over The Air (OTA) chamber, where testing may be performed using the recreated wireless channel. Effective channel recreation therefore requires an accurate estimate of the channel impulse response, which in effect may act as the channel estimate.

The channel impulse response may be estimated based on OFDM pilot symbols recorded in the field. As opposed to performing multiple drive tests, the field measurement of the pilot symbols may only need to be performed once. A channel impulse response may then be derived from the recorded pilot symbols and may subsequently be used as the channel estimate for recreation in a VDT environment.

Sparse channel estimation, particularly sparse Bayesian learning, has proven to be an effective method for obtaining highly accurate channel impulse response estimates. However, as will be later described in further detail, such sparse Bayesian channel estimation methods involve discretizing the delay domain. In other words, the delay domain may be reduced from the continuous domain in real-world applications to a finite discrete grid of points. While the delay domain discretization may be advantageous in reducing processing requirements for estimating channel impulse responses, the discretization may introduce a "model mismatch" (i.e. significant differences between the channel impulse response estimate and the actual channel impulse response), which may result in performance degradation in VDT environments.

Improved performance of VDT may be realized by utilizing a channel estimation method that considers a continuous-domain delay space as opposed to a discretized delay space. Such a continuous domain-delay channel estimation method may provide significant improvements over a discretized-domain delay method, and may estimate the number of multipath components as well as their associated parameters (delays and gains) with high accuracy.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
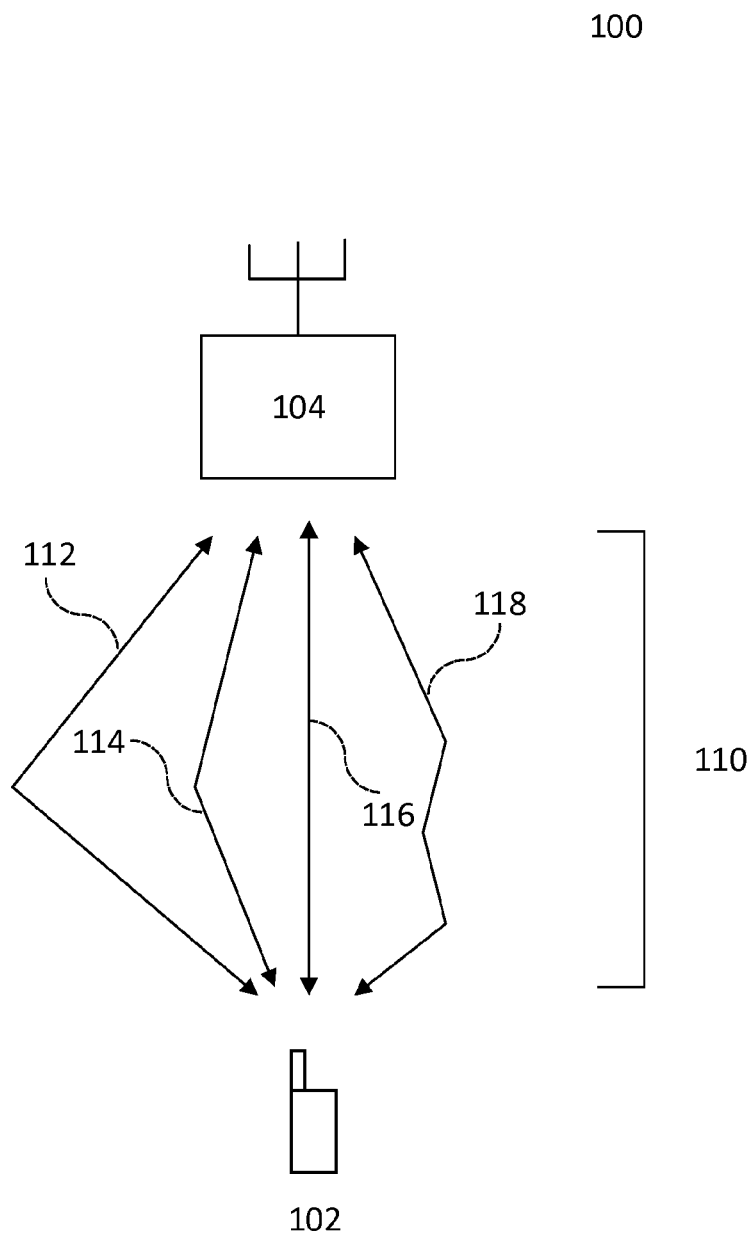
FIG. 1 shows a mobile radio communication system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

As used herein, a "cell" in the context of telecommunications may be understood as a sector of a base station. A base station may thus be composed of one or more "cells" (or sectors), where each cell includes at least one unique communication channel. An "inter-cell handover" may thus be understood as handover from a first "cell" to a second "cell", where the first "cell" is different than the second "cell". "Inter-cell handovers" may be characterized as either "inter-base station handovers" or "intra-base station handovers". "Inter-base station handovers" may be understood as handover from a first "cell" to a second "cell", where the first "cell" is provided at a first base station and the second "cell" is provided at a second, different base station. "Intra-base station handovers" may be understood as a handover from a first "cell" to a second "cell", where the first "cell" is provided at the same base station as the second "cell". A "serving cell" may be understood as a "cell" which a mobile terminal is currently connected to according to the mobile communication protocols of the associated mobile communication network standard.

Channel estimation may be performed by estimating the channel impulse response of a target wireless channel. In conventional Long Term Evolution (LTE) networks, channel impulse responses may be estimated by recording pilot Orthogonal Frequency Division Multiplexing (OFDM) symbols transmitted by base stations during field tests. The recorded pilot symbols may then be utilized to estimate the effects of a wireless channel on signals transmitted thereon in order to obtain a channel impulse response of the wireless channel.

The determined channel impulse response estimates may then be utilized in order to perform Virtual Drive Testing (VDT), e.g. in order to perform simulations in a lab environment as opposed to more costly field testing. The wireless channels may be recreated in an Over The Air (OTA) chamber in order to simulate the effects of each channel on wireless signals transmitted thereon.

The signal model for reception of OFDM symbols may be utilized to develop a basis for channel impulse response estimation. As previously detailed, OFDM pilot symbols transmitted by a network transmitter (such as e.g. a base station) may be received and recorded. The received OFDM pilot symbols may then be analyzed in order to evaluate wireless channel effects on the transmitted pilot symbols, thereby obtaining a channel impulse response.

A plurality of OFDM pilot symbols may be received in an OFDM system and used to derive a channel impulse response. As OFDM systems conventionally utilize multiple subcarriers per receiver, the plurality pilot symbols may be received over up to N subcarriers. An OFDM system may utilize a sampling period of $T_S$ with a cyclic prefix duration $T_{CP}$, where the cyclic prefix is a guard period at the start of each OFDM symbol to prevent inter-symbol interference between subsequent OFDM symbols caused by multipath delay.

Each of the received OFDM pilot symbols may be identified according to the $m^{th}$ pilot index, where $m \in M$ and the set of possible pilot indices is M. One symbol may be received over each of the N subcarriers, thereby bounding the set of possible pilot indices M to $M \subseteq \{1, \ldots, N\}$.

A set of observations each corresponding to one of the received OFDM pilot symbols may thus be derived from received OFDM pilot symbols. The set of observations may then be used to estimate the channel impulse response according to the methods enclosed herein. An OFDM symbol associated with the $m^{th}$ pilot index may be received and subsequently demodulated by the OFDM receiver, such as e.g. by performing cyclic prefix removal and a Discrete Fourier Transform, in order to yield a demodulated OFDM pilot symbol. The demodulated pilot symbol may then be divided by a corresponding predefined pilot symbol (of unit amplitude) to derive the $m^{th}$ observation of the system. The $m^{th}$ observation may thus characterize the channel effects of the wireless channel. The $m^{th}$ observation $y_m$ may be defined according to Equation 1 below:

$$y_m = h_m + z_m \quad (1),$$

where $h_m$ is the $m^{th}$ sample of the frequency response of the channel and $z_m$ is the noise at the receiver.

The set of observations $y_m$, $m \in M$, may then be utilized according to Equation 1 in order to obtain the channel impulse response of the system. The channel impulse response in time $g(\tau)$ is conventionally modeled as the superposition in time of K specular multipath components. An exemplary illustration is shown in FIG. 1. As shown in FIG. 1, base station 104 may transmit a wireless signal to User Equipment (UE) 102. The wireless signal may be directly transmitted to UE 102 over multipath channel 116, which may be substantially straight. However, multipath propagation present in the wireless channel may result in UE 102 receiving the wireless signal over one or more additional paths. For example, the wireless signal transmitted by base station 104 may reflect off of terrestrial objects, such as e.g. buildings, bodies of water, other natural landforms, etc., or may refract or reflect off of the atmosphere or ionosphere. As a result, UE 102 may receive multiple reflected versions of the wireless signal in addition to receiving the wireless signal over direct multipath 116. For example, UE 102 may receive three additional versions of the wireless signal (e.g. multipaths) over multipath channels 112, 114, and 118. As the overall distance the wireless signal traveled will vary with each of multipath channels 112-118, UE 102 will receive the multiple versions of the wireless signals at different times. Additionally, the signal strength of each of the versions of the received wireless signal will vary with each of multipath channels 112-118, e.g. to the unique channel gain of each of multipath channels 112-118.

As a result, the actual wireless signal received by UE 102 will be composed of multiple time-delayed versions of the same signal where each version has a different signal strength (in addition to other noise and interference) due to the unique characteristics of each of multipath channels 112-118. The combined effects of the time-delay and relative gains of each channel may be characterized by the channel impulse response, which may reflect the unique time-delay and gain of each of multipath channels 112-118. Overall channel 110, consisting of the combined effects of multipath channels 112-118, may thus be estimated by calculating the number of multipath components (e.g. four in the current example), the time-delay associated with each of the multipath components, and the gain associated with each of the multipath components.

Accordingly, the channel impulse response in time $g(\tau)$ of a channel composed of K multipath components may be modeled according to Equation 2 below:

$$g(\tau) = \sum_{k=1}^{K} a_k \delta(\tau - \tau_k), \quad (2)$$

where $a_k$ is the complex gain of each of the $k^{th}$ multipath component ($a_k \in C$; where C is the domain of possible complex gains), $\delta(\cdot)$ is the dirac-delta function, where $\tau_k$ is the delay associated with the $k^{th}$ multipath component ($\tau_k \in [0; T_{CP}]$, i.e. $\tau_k$ is bounded between 0 and the cyclic prefix $T_{CP}$).

Equation 1 may thus be rewritten using the frequency response corresponding to the channel impulse response $g(\tau)$ as follows:

$$y_m = h_m + z_m = \sum_{k=1}^{K} a_k e^{-j2\pi \frac{m}{NT_s}\tau_k} + z_m, \quad (3)$$

where $h_m$ and $z_m$ denote the $m^{th}$ sample of the frequency response and receiver noise, respectively. $z_m$ is defined in relation to Equation 3 as independent zero-mean complex Gaussian distributed noise $z_m \sim CN(0, \lambda^{-1})$, where $\lambda$ is the noise precision (i.e. the inverse of the variance of the noise). The receiver noise $z_m$ may thus be estimated using the same noise precision value $\lambda$ for all of the K multipath components.

The multipath delay components $\tau_k$ in Equation 3 are in the continuous time domain, and accordingly may be any value ranging from $[0; T_{CP}]$ (as the cyclic prefix $T_{CP}$ is conventionally selected to be greater than the largest possible multipath delay spread). In traditional channel estimation procedures, the delay domain is discretized, i.e. the continuous interval $[0; T_{CP}]$ is replaced by a reduced search space consisting of a finite grid of evenly spaced points $\{t_i = i \cdot \Delta t | i = 0, \ldots P-1\}$, where P is the number of total points in the grid and $\Delta t$ is the grid spacing (or grid resolution) defining the distance between each of the points. As it is assumed that the multipath delay values range from 0 to $T_{CP}$, the grid spacing $\Delta t$ is calculated as $\Delta t = T_{CP}/(P-1)$. The observation model for the $m_{th}$ observation may thus be approximated using a discretized delay space as follows:

$$y_m = \sum_{i=1}^{P} w_i e^{-j2\pi \frac{mi}{NT_s} \Delta t} + z_m, \quad (4)$$

where $m \in M$ and $w_i$ is the $i^{th}$ element of a vector $w = (w_1, \ldots, w_P)^T$.

Note that the original model of $y_m$ defined in Equation 3 is only recovered by the approximation of Equation 4 when each of the K multipath components fall exactly on one of the grid points $t_i$ on the evenly-spaced discrete delay grid and P-K of the elements (i.e. weights) in the weight vector w are equal to zero. This is practically unrealizable in real-world scenarios; however, selecting P>>K may give a sufficiently high resolution of points in the discrete delay grid to accurately estimate the multipath delay of each of the K multipath components. Selecting a higher grid resolution in conventional channel estimation approaches may provide a higher degree of accuracy in overall channel estimation.

Sparse channel estimators attempt to determine a sparse vector w of weights with P total elements, i.e. a vector w containing a small number of non-zero elements, where each weight corresponds to the respective multipath gain of one of the multipath channels. As P>>K, the majority of elements in w are expected to be zero, where the number of non-zero elements in the determined sparse vector w represents the estimated total number of multipath components. The values of each of the non-zero elements of w are an estimated channel gain for one of the multipath components, where the index of each non-zero element in the vector w gives estimated multipath component delay. For example, each of the P elements of w is associated with an $i^{th}$ index of the vector w, where the corresponding estimated multipath delay $t_i$ for the $i^{th}$ element may be calculated as $t_i = i \cdot \Delta t$ according to the discretized delay grid of P points separated by $\Delta t$ in time. Accordingly, the estimated delay for each of the non-zero elements of w may be calculated based on the index i of each non-zero element in w. The remaining zero-valued elements of w each corresponding to the remaining indices in w are thus assumed to not be multipath components, and thus there is assumed to be no multipath component with a multipath delay corresponding to the remaining indices.

Accordingly, a spare channel estimator may attempt to determine a sparse vector w of P total elements from the observation model of Equation 4. This problem may be approached as a compressed sensing recovery problem, and may conventionally be solved using sparse Bayesian learning (SBL). Equation 4 may be rewritten in matrix-vector notation as follows:

$$y = \Phi w + z \quad (5),$$

where $\Phi$ is the dictionary matrix of the SBL problem containing P columns corresponding to each of the grid points of the discretized delay grid. The $i^{th}$ column of the $\Phi$ is therefore the vector $$\left( e^{-j2\pi \frac{mi}{NT_s} \Delta t} \mid m \in M \right)^T$$

(from Equation 4).

Each of the i columns of $\Phi$ is therefore associated with one of the discretized delay grid points defined by $i \cdot \Delta t$, and consequently any solutions will be based on the discretized delay space. The use of a discrete delay space in this manner may result in model mismatch between the obtained channel impulse response estimate (defined by the multipath delay components, weights, and noise precision) and the actual channel impulse response. It is therefore desirable to estimate the multipath delays using a continuous delay space in order to obtain more accurate estimates for each multipath delay component.

An alternative observation model to Equation 5 may be provided in order to estimate continuous-valued delays. In other words, the multipath delays may be estimated individually in a continuous space for each multipath component instead of relying on the index i of non-zero weights in w in order to calculate the corresponding delay point on the discrete grid (i.e. where the delay of the $i^{th}$ weight in w is calculated as $\theta_i = i \cdot \Delta t$). Accordingly, the domain of possible delay values is no longer limited by the discrete grid resolution $\Delta t$. Such a model may reduce the effects of model mismatch, and may result in a significantly more accurate channel impulse response estimate.

As opposed to utilizing a sparse weight vector w with P elements (where P>>K and each of the P elements corresponding to one of a possible delay value on the discrete delay grid), the updated continuous-domain observation model may utilize a weight vector $w = (w_1, \ldots, w_L)^T$ corresponding to L multipath components, where L≥K, i.e. where the number of multipath components L of the observation model may be any value equal to or greater than the actual number of multipath components K. Each weight $w_i$ may thus be the weight of the $i^{th}$ multipath component of the observation model.

The multipath delay corresponding to each of the L multipath components may be "normalized" by scaling the delay domain by the constant term $$-\frac{2\pi}{NT_s}.$$

The delay vector $\theta$ may thus be composed of normalized delays where $\theta = (\theta_1, \ldots, \theta_L)^T$.

Following normalization of the delays, the observation model may thus be written as:

$$y_m = \sum_{i=1}^{L} w_i e^{jm\theta_i} + z_m, \quad (6)$$

where the continuous-domain normalized delay vector $\theta$ has been substituted to replace $$-\frac{2\pi i}{NT_s}\Delta t$$

in Equation 4.

Equation 6 may be rewritten in matrix-vector notation (analogous to Equation 5) as follows:

$$y = \Phi(\theta)w + z \quad (7),$$

where the dictionary matrix $\Phi(\theta) = [\phi(\theta_1), \ldots, \phi(\theta_L)]$ now depends on each of the delays $\theta$ to be estimated. The $i^{th}$ column of the dictionary matrix $\Phi(\theta)$, where $1 \le i \le L$, is the vector-valued function $\phi(\theta_i) = (e^{jm\theta_i} | m \in M)^T$.

While conventional SBL channel estimation methods utilize a fixed delay grid while estimating weights w and noise precision estimate $\lambda$, the proposed observation model now contains continuous-delay dictionary matrix $\Phi(\theta)$ to be similarly estimated. The conventional SBL channel estimators operate by performing iterative updates of each of the weights w and noise precision estimate $\lambda$ until a suitable sparse vector w is obtained, and accordingly calculates the number of multipath components based on the number of non-zero elements in w. Each of the respective multipath delays may then be determined by the respective index of each non-zero element in w. The modified channel estimator may perform similar updates of the weight and noise precision estimates in addition to an added procedure for updating the delay estimates $\theta_i$ of the dictionary matrix $\Phi(\theta)$. The delay estimates $\theta_i$ may not be limited to a discretized grid, and therefore may be able to take any value in the continuous interval $[0; T_{CP}]$.

The delay estimates $\theta_i$ may also be updated according to an iterative process in which the columns of the dictionary are refined (i.e. updated) during each iteration. The dictionary matrix $\Phi(\theta)$ may thus be considered "dynamic" as opposed to the traditional SBL approach with a "static" dictionary (i.e. "fixed" according to the delay grid).

The CIR estimator may be similarly based on the Bayesian approach to estimate the delay $\theta$ and weight w for each of the L multipath components using observations $y_m$, m∈M (i.e. observations derived from a received OFDM pilot symbol). The CIR estimator may simultaneously estimate the noise precision $\lambda$ in order to characterize the receiver noise (as zero-mean complex Gaussian noise with precision $\lambda$ as previously detailed) for all multipath components in the model. As L≥K, the number of multipath components in the observation model may be greater than the number of actual multipath components. Consequently, the model order estimate (i.e. number of estimated multipath components of the model) is the number of non-zero coordinates of w.

The CIR estimator may first define a probabilistic model characterizing the probability density associated with the weights w, delays $\theta$, and noise precision estimate $\lambda$. The probabilistic model may be based on the prior probability distributions for each of weights w, delays $\theta$, and noise precision estimate $\lambda$, and may be further conditioned on the received observations $y_m$, m∈M. The probabilistic model may thus be a posterior probability distribution.

The prior probability distributions for each of weights w, delays $\theta$, and noise precision estimate $\lambda$ may be a probability density function (PDF). The PDF of w may be modeled using a hierarchical sparsity-inducing model. Each weight of w is assumed to be independent of the other weights, and may be conditioned on the gain precision hyperparameter $\gamma_i$ associated with the $i^{th}$ weight $w_i$ in vector w. The PDF for the $i^{th}$ weight $w_i$ may be modeled as a zero-mean complex Gaussian PDF $p(w_i|\gamma_i) = p_{CN}(w_i; 0, \gamma_i^{-1})$ where gain precision $\gamma_i$ controls the precision. Each hyperparameter $\gamma_i$ may be modeled by a hyperprior, which may be a gamma PDF $p(\gamma_i) = p_{gam}(\gamma_i; a, b)$ defined by shape a and rate b. The prior PDF of the noise precision $\lambda$ may be non-informative and defined as $p(\lambda) = p_{gam}(\lambda; 0,0)$. The prior PDF of the $i^{th}$ delay $\theta_i$ is set as $$p(\theta_i) = p_{unif}\left(\theta_i; -2\pi \frac{T_{CP}}{NT_s}, 0\right).$$

The joint posterior PDF of w, $\theta$, $\lambda$, and $\gamma$ may jointly provide the PDF of w, $\theta$, $\lambda$, and $\gamma$ based on (i.e. conditioned on) the received observations y and is defined as:

$$p(\theta, w, \gamma, \lambda \mid y) = \frac{1}{p(y)} p(y \mid \theta, w, \lambda) p(\lambda) \prod_{i=1}^{L} p(\theta_i) p(w_i \mid \gamma_i) p(\gamma_i). \quad (8)$$

From Equation 7, the likelihood function is $p(y|\theta, w, \lambda) = p_{CN}(y; \Phi(\theta)w, \lambda^{-1}I)$, where I denotes the identity matrix.

The SBL channel estimator may thus try to find an expected value for each of channel parameters w, $\theta$, $\lambda$, and $\gamma$ based on the received observations y. However, determining the expected value of each parameter from the join posterior PDF of Equation 8 may be computationally intensive, and a more approachable implementation may be desired. Accordingly, the SBL channel estimator may calculate a surrogate PDF $q(\theta, w, \gamma, \lambda)$ which is an approximation of joint posterior PDF $p(\theta, w, \gamma, \lambda|y)$. Surrogate PDF $q(\theta, w, \gamma, \lambda)$ may be a factorized approximation of joint posterior PDF $p(\theta, w, \gamma, \lambda|y)$, where each factor is a marginal posterior PDF corresponding to one of channel parameters w, 74, $\lambda$, and $\gamma$. Consequently, surrogate PDF $q(\theta, w, \gamma, \lambda)$ may offer a more reasonable avenue to calculate the expected value of each of w, $\theta$, $\lambda$, and $\gamma$, thereby reducing the computations associated with obtaining a channel estimate.

The surrogate PDF $q(\theta, w, \gamma, \lambda)$ may be constrained to factorize as:

$$q(\theta, w, \gamma, \lambda) = q(w)q(\lambda) \prod_{i=1}^{L} q(\theta_i) q(\gamma_i) \quad (9)$$

where the PDF $q(\cdot)$ for each of the corresponding variables $\theta$, w, $\gamma$, and $\lambda$ may be separated from the PDF of each of the remaining variables. Each factor $q(\cdot)$ is referred to as the belief of the respective variable and is an approximation of the variable's marginal posterior.

The estimated channel impulse response may be modeled according to the factors expected value of each $q(w)$, $q(\lambda)$, $q(\theta_i)$, and $q(\gamma_i)$ of surrogate PDF $q(\theta, w, \gamma, \lambda)$. As previously detailed, the channel impulse response may be characterized according to delays $\theta$, weights w, and noise precision $\lambda$, where the delays $\theta$ and weights w are vectors containing a delay $\theta_i$ and weight $w_i$ corresponding to the delay and weight of the $i^{th}$ multipath component of the model. Accordingly, the estimated channel impulse response may be similarly characterized based on the estimated channel parameters $\hat{\theta}$, $\hat{w}$, and $\hat{\lambda}$, where each of estimated channel parameters $\hat{\theta}_i$, $\hat{w}$, and $\hat{\lambda}$ may be calculated by determining the expected value of each of beliefs $q(w)$, $q(\lambda)$, and $q(\theta_i)$ from surrogate PDF $q(\theta, w, \gamma, \lambda)$.

The SBL channel estimator may then estimate the joint posterior PDF $p(\theta, w, \gamma, \lambda|y)$ based on which variable estimates can be conveniently computed. In order to simplify the associated calculations, a surrogate PDF $q(\theta, w, \gamma, \lambda)$, may be introduced in order to approximate the joint posterior PDF $p(\theta, w, \gamma, \lambda|y)$. The surrogate PDF $q(\theta, w, \gamma, \lambda)$ may be a factorized approximation of $p(\theta, w, \gamma, \lambda|y)$ that minimizes the Kullback-Leibler divergence (KL divergence) from $p(\theta, w, \gamma, \lambda|y)$ in order to maintain an accurate model. With $\langle \cdot \rangle$ denoting expectation, the estimates of each variable may be calculated based on its respective belief function and are defined as $\hat{\theta}_i = \arg\{\langle e^{j\theta_i}\rangle_{q(\theta_i)}\}$, $\hat{w} = \langle w \rangle_{q(w)}$, $\hat{\lambda} = \langle \lambda \rangle_{q(\lambda)}$, and $\hat{\gamma}_i = \langle \gamma_i \rangle_{q(\gamma_i)}$.

Each of estimated channel parameters $\hat{\theta}$, $\hat{w}$, and $\hat{\lambda}$ may thus be obtained based on surrogate PDF $q(\theta, w, \gamma, \lambda)$. The calculation of each of estimated channel parameters $\hat{\theta}$, $\hat{w}$, and $\hat{\lambda}$ may depend on the other estimated channel parameters, and consequently the calculation of each of estimated channel parameters $\hat{\theta}$, $\hat{w}$, and $\hat{\lambda}$ may be done in an iterative fashion. For example, one of estimated channel parameters $\hat{\theta}$, $\hat{w}$, and $\hat{\lambda}$ may be selected to be updated. The remaining channel parameters may then be utilized in order to perform the appropriate update of the selected estimated channel parameter. Following completion of the update, another of estimated channel parameters $\hat{\theta}$, $\hat{w}$, and $\hat{\lambda}$ may be updated using the newly updated originally selected estimated channel parameter. This process may continue, with iterative updates of each of estimated channel parameters $\hat{\theta}$, $\hat{w}$, and $\hat{\lambda}$ being repeatedly performed. Additionally, as detailed above estimated weights $\hat{w}$ may be conditioned on estimated gain precisions Estimated gain precisions $\gamma_i$ may additionally depend on the other estimated channel parameters $\hat{\theta}$, $\hat{w}$, and $\hat{\lambda}$, and consequently estimated gain precisions $\hat{\gamma}_i$ may also be updated as part of the same iterative process. Estimated gain precisions $\hat{\gamma}_i$ may thus also be considered as one of the estimated channel parameters along with $\hat{\theta}$, $\hat{w}$, and $\hat{\lambda}$.

As previously detailed, each of estimated channel parameters $\hat{\theta}$, $\hat{w}$, $\hat{\lambda}$, and $\hat{\gamma}$ may be calculated as the expected value of the respective belief $q(w)$, $q(\lambda)$, $q(\theta_i)$, and $q(\gamma_i)$ (where $\hat{\theta}$ is a vector containing expected values of $q(\theta_i)$ and $\hat{\gamma}$ is a vector containing expected values of $q(\hat{\gamma}_i)$ for all i, i∈L in the model). In order to reduce model mismatch, estimated channel parameters $\hat{\theta}$, $\hat{w}$, and $\hat{\lambda}$ may each be updated in such a manner as to minimize the probablistic divergence, such as e.g. the KL divergence, between surrogate PDF $q(\theta, w, \gamma, \lambda)$ and joint posterior PDF $p(\theta, w, \gamma, \lambda|y)$.

As the iterative update of each of estimated channel parameters $\hat{\theta}$, $\hat{w}$, $\hat{\lambda}$, and $\hat{\gamma}$ depends on the other estimated channel parameters, the remaining estimated channel parameters being used in the update may be held constant in time and provided for the update of the estimated channel parameter currently being updated. Each of estimated channel parameters $\hat{\theta}$, $\hat{w}$, $\hat{\lambda}$, and $\hat{\gamma}$ may therefore be updated using the remaining estimated channel parameters and the received observations y based on a predetermined criteria that will minimize the KL divergence between surrogate PDF $q(\theta, w, \gamma, \lambda)$ and joint posterior PDF $p(\theta, w, \gamma, \lambda|y)$. For example, an expected value for each of estimated channel parameters $\hat{\theta}$, $\hat{w}$, $\hat{\lambda}$, and $\hat{\gamma}$ may be calculated based on the other estimated channel parameters and observations $\theta_i$ that will minimize the KL divergence between surrogate PDF $q(\theta, w, \gamma, \lambda)$ and joint posterior PDF $p(\theta, w, \gamma, \lambda|y)$.

As opposed to conventional SBL CIR estimators, the provided CIR estimator performs updates of the multipath delay estimates $\theta_i$ for each multipath component in addition to the conventional weight and noise precision updates. The belief $q(\theta_i)$ associated with multipath delay $\theta_i$ that minimizes the Kullback-Leibler divergence between $q(\theta, w, \gamma, \lambda)$ and $p(\theta, w, \gamma, \lambda|y)$ is given as the following proportion:

$$q(\theta_i) \propto p(\theta_i) \prod_{m \in M} p_{VM}(m\theta_i; \mu_{i,m}, \kappa_{i,m}), \quad (10)$$

where $p_{VM}(\cdot; \mu, \kappa)$ denotes a von Mises PDF with mean direction $\mu$ and concentration parameter $\kappa$. In Equation 10, $\mu_{i,m}$ and $\kappa_{i,m}$ are the argument and magnitude, respectively, of the $m^{th}$ component of the complex vector $\eta_i = 2\hat{\lambda}[(y - \Sigma_{l \neq i} \hat{w}_l \hat{\phi}_l) \hat{w}_i^* - \Sigma_{l \neq i} [C]_{l,i} \hat{\phi}_l]$, where C denotes the covariance of the weights w and $\hat{\phi}_l = \langle \phi(\theta_l) \rangle_{q(\phi_l)}$.

Equation 10 thus gives the form of the delay belief $q(\theta_i)$ that will minimize the KL divergence between surrogate PDF $q(\theta, w, \gamma, \lambda)$ and joint posterior PDF $p(\theta, w, \gamma, \lambda|y)$. The delay estimate $\hat{\theta}_i$ for the $i^{th}$ multipath component may thus be obtained by calculating the expected value $\hat{\theta}_i = \arg\{\langle e^{j\theta_i}\rangle_{q(\theta_i)}\}$ for the delay belief $q(\theta_i)$ satisfying Equation 10.

However, the solution to Equation 10 may not be tractable due to the presence of the m-fold von Mises PDFs, and accordingly it may not be possible to compute $\hat{\theta}_i = \arg\{\langle e^{j\theta_i}\rangle_{q(\theta_i)}\}$ as a closed solution. Equation 10 may therefore be simplified by using a mixture of m von Mises PDFs to approximate each of the m-fold wrapped von Mises PDFs on the right side of Equation 10. This approach may exploit the property that von Mises PDFs are closed under multiplication, thereby making the method tractable (i.e. solvable in terms of a closed expression). Specifically, for all m∈M the following approximation may be made:

$$p_{VM}(m\theta_i; \mu_{i,m}, \kappa_{i,m}) \approx \frac{1}{m}\sum_{r=0}^{m-1} p_{VM}\left(\theta_i; \frac{\mu_{i,m} + 2r\pi}{m}, \tilde{\kappa}_{i,m}\right), \quad (11)$$

where the concentration $\tilde{\kappa}_{i,m}$ is the solution of the transcendental equation $I_m = (\tilde{\kappa}_{i,m}) = I_1(\kappa_{i,m})/I_0(\kappa_{i,m})$ with $I_m(\cdot)$ being the modified Bessel function of the first kind and order m.

The approximation of Equation 11 thus relies on matching the characteristic function of a wrapped von Mises PDF with a further von Mises PDF. Given that multiplication of two von Mises PDFs will yield another von Mises PDF, the right hand side of Equation 10 will therefore contain a mixture of $\prod_{m\in M}$ m von Mises PDFs. The resulting number of components will be extremely high for most practical settings (e.g. 10-factorial or more), and accordingly the number of components in the model may be limited to D using a sequential procedure.

Specifically, the von Mises mixture approximation may be progressively built by multiplying the mixtures corresponding to the first two indices in M and truncating the resulting mixture to the D dominant components with means in $$\left[-2\pi\frac{T_{CP}}{NT_s}; 0\right].$$

Next, the current mixture may be multiplied with the mixture corresponding to the third index in M followed by similarly truncating the outcome. The process may be repeated by sweeping through all indices in M.

The outcome of this sequential procedure is a mixture of D von Mises PDFs representing belief an approximation of delay belief $q(\theta_i)$ as satisfying Equation 10. As previously detailed, the delay estimates $\hat{\theta}_i$ may be calculated by computing the expectation $\hat{\theta}_i = \langle \phi(\theta_i)\rangle_{q(\theta_i)}$, which may be easily computed using the resulting mixture of D von Mises PDFs.

The estimated weights $\hat{w}$, noise precision $\hat{\lambda}$, and gain precision hyper-parameters $\hat{\gamma}_i$ may also be iteratively updated. One of the estimated channel parameters $\hat{\theta}, \hat{w}, \hat{\lambda}$, and $\hat{\gamma}$ may thus be updated while holding the remaining estimated channel parameters fixed.

Similarly to delay estimates $\hat{\theta}$, weight estimates $\hat{w}$ may be updated according to a predefined criteria for weight belief $q(w)$ that minimizes the KL divergence between surrogate PDF $q(\theta, w, \gamma, \lambda)$ and joint posterior PDF $p(\theta, w, \gamma, \lambda|y)$. Specifically, the belief $q(w)$ minimizing the KL divergence may be defined as a Gaussian PDF with mean $\hat{w} = \hat{\lambda} C \hat{\Phi} y$ and covariance $C = (\hat{\lambda}\hat{\Phi}^H\hat{\Phi} + \hat{\Gamma})^{-1}$, where $\hat{\Gamma} = \text{diag}(\hat{\gamma}_1, \ldots, \hat{\gamma}_L)$, the refined dictionary $\hat{\Phi} = [\hat{\phi}_1, \ldots, \hat{\phi}_L]$, $[\Phi^H\Phi]_{k,l} = M$ if $k=l$, and $[\Phi^H\Phi]_{k,l} = \hat{\phi}_k^H\hat{\phi}_l$ if $k \neq l$. Accordingly, the expectation $\hat{w} = \langle w\rangle_{q(w)}$ may be computed as the mean of the resulting Gaussian PDF, wherein the expectation $\hat{w}$ depends on the estimated precision hyper-parameter vector $\hat{\gamma}$, noise precision estimate $\hat{\lambda}$, delay estimates $\hat{\theta}$, and observations y. Each of the current values for each estimated channel parameter may thus be used to calculate weight estimate $\hat{w}$.

The noise precision estimate $\hat{\lambda}$ may also be calculated by determining the expected value of the noise precision belief $q(\lambda)$ that minimizes the KL divergence between surrogate PDF $q(\theta, w, \gamma, \lambda)$ and joint posterior PDF $p(\theta, w, \gamma, \lambda|y)$. Specifically, the belief $q(\lambda)$ is a gamma PDF with a mean satisfying $$\hat{\lambda}^{-1} = \frac{1}{M}\left[y^H y + \hat{w}^H\hat{\Phi}^H\hat{\Phi}\hat{w} - 2Re(y^H\hat{\Phi}\hat{w}) + tr(\hat{\Phi}^H\hat{\Phi}C)\right].$$

The expectation $\hat{\lambda} = \langle\lambda\rangle_{q(\lambda)}$ may be thus be computed accordingly based on the determined mean, which similarly is dependent on observations y, weight estimates $\hat{w}$, and delay estimates $\hat{\theta}$.

The gain precision hyperparameter estimate $\hat{\gamma}_i$ may also be iteratively updated, and utilized to determine the appropriate weight estimate $\hat{w}$. For each $i=1, \ldots, L$, the hyper-parameter factor $q(\gamma_i)$ of the surrogate PDF $q(\theta, w, \gamma, \lambda)$ satisfying the KL divergence criteria may be a gamma PDF with mean $\gamma_i = (1+a)/(|\hat{w}_i|^2 + [C]_{i,i} + b)$. Accordingly, the mean may be taken as expectation $\hat{\gamma}_i = \langle\gamma_i\rangle_{q(\gamma_i)}$.

Each of the estimated channel parameters $\hat{\theta}, \hat{w}, \hat{\lambda}$, and $\hat{\gamma}$ may therefore be updated according to the above-described process. This may be performed as an iterative process, where one of the beliefs is updated while holding the remaining elements fixed. The update during each iteration for each belief may be obtained by minimizing the KL divergence of $p(\theta, w, \gamma, \lambda|y)$ from $q(\theta, w, \gamma, \lambda)$. As detailed above, a specific criteria for each belief $q(w), q(\lambda), q(\theta_i)$, and $q(\gamma_i)$ that minimizes the KL divergence may be used to calculate the updated value for each estimated channel parameter $\hat{\theta}, \hat{w}_i, \hat{\lambda}$, and $\hat{\gamma}$.

The iterative update process may be performed a certain number of times, or until a predetermined termination criteria is reached. Upon completion, the estimated channel parameters may then be utilized to characterize the channel impulse response of the wireless channel which the OFDM symbols were received over. For example, the estimated channel parameters $\hat{\theta}, \hat{w}$, and $\hat{\lambda}$ may be utilized to characterize the channel impulse response in terms of a multipath channel, where the number of non-zero elements of $\hat{w}$ indicates the total number of multipath components, the values of the non-zero elements of $\hat{w}$ denotes the channel gain of the multipath component, and the respective element in $\hat{\theta}$ identifies the multipath delay of the multipath component. The noise precision estimate $\hat{\lambda}$ provides the precision parameter used to model the receiver noise as zero-mean complex Gaussian noise. An accurate channel impulse response may thus be obtained.

Figure 2:
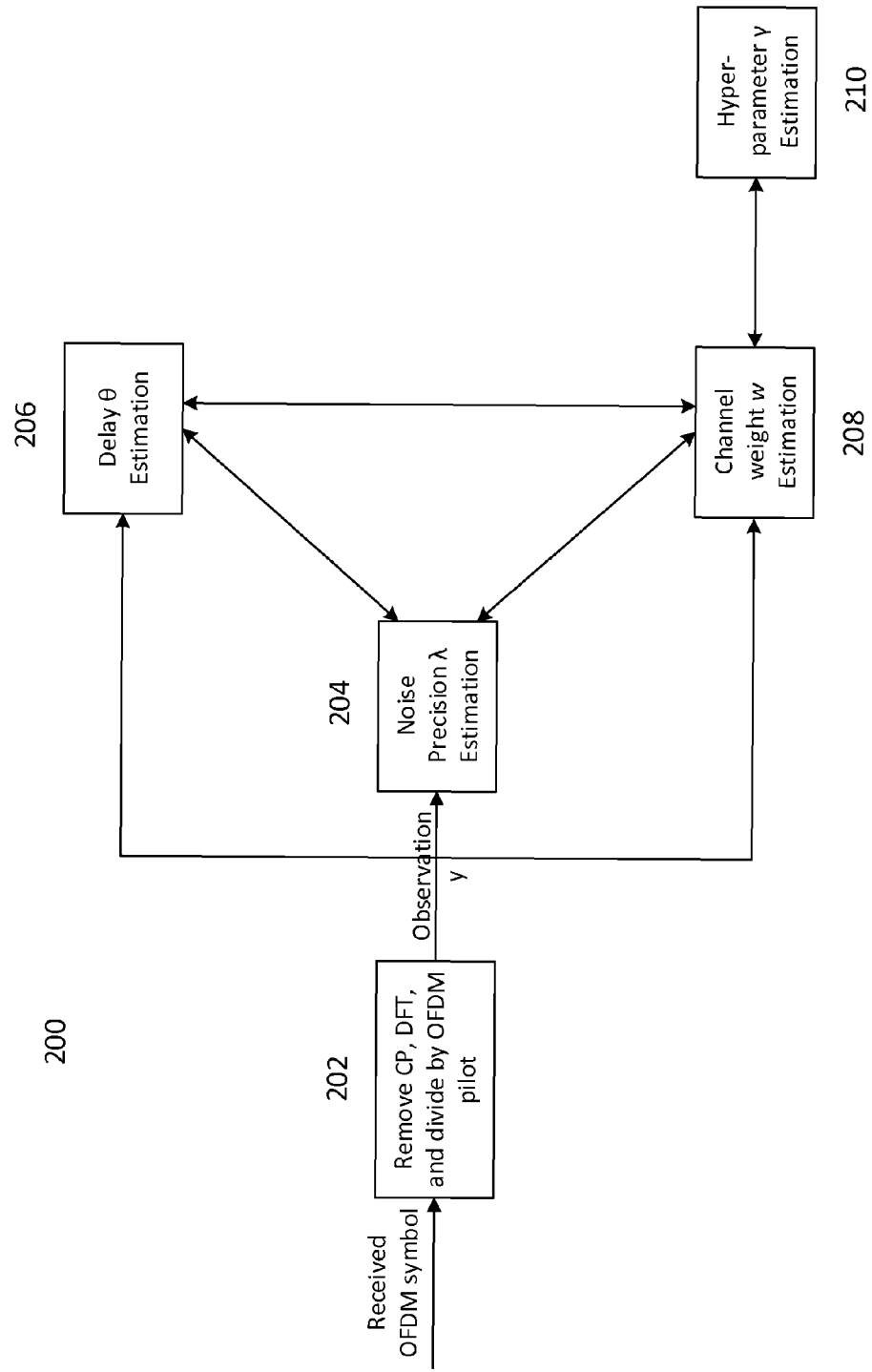
FIG. 2 shows a block diagram illustrating a channel estimation.

FIG. 2 illustrates a block diagram 200 showing how each estimated channel parameter $\hat{\theta}, \hat{w}, \hat{\lambda}$, and $\hat{\gamma}$ may be iteratively updated in order to arrive at accurate estimates for use in characterizing a channel impulse response of an OFDM system. One or more OFDM pilot symbols may be wirelessly received by an OFDM receiver, which may be e.g. performed during a field drive test. The received pilot symbol may then be processed as an observation in an observation model to evaluate the channel effects of the wireless channel, thereby eventually obtaining a channel impulse response estimate.

The received OFDM pilot symbol may be initially processed at pre-processing block 202, where the cyclic prefix may be removed from the symbol. Demodulation of the OFDM pilot symbol may then proceed in calculating a Discrete Fourier Transform of the pilot symbol as is well-known for OFDM receivers. The received pilot symbol may then be divided by a pre-defined (i.e. previously known/ defined by the network) OFDM pilot symbol corresponding to the received pilot symbol in order to arrive further isolate the wireless channel effects on the OFDM pilot symbol during transmission.

The resulting symbol y may thus be treated as an observation of the observation model used to estimate the channel impulse response. As previously detailed, a plurality of pilot symbols may be received and processed to obtain a plurality of observations included in the observation vector y.

The resulting observation vector y may then be utilized according to the above-detailed processes in order to iteratively update each of estimated channel parameters $\hat{\theta}$, $\hat{w}$, $\hat{\lambda}$, and $\hat{\gamma}$ based on the respective beliefs $q(w)$, $q(\lambda)$, $q(\theta_i)$, and $q(\gamma_i)$ of surrogate PDF $q(\theta, w, \gamma, \lambda)$. As shown in FIG. 2, the observations y may be provided to each of noise precision $\lambda$ estimation block 204, delay $\theta$ estimation block 206, and channel weight w estimation block 208. Each of estimation blocks 204-208 may then calculate the estimated channel parameter $\hat{\theta}$, $\hat{w}$, and $\hat{\lambda}$ corresponding to the respective element $\theta$, w, or $\gamma$ based on the received observations y as well as the current values of the remaining estimated channel parameters $\hat{\theta}$, $\hat{w}$, and $\hat{\lambda}$. Each of estimation blocks 204-208 may thus be configured to provide each of the other estimation blocks with the current value of estimated channel parameters $\hat{\theta}$, $\hat{w}$, or $\hat{\lambda}$. The current value of estimated channel parameters $\hat{\theta}$, $\hat{w}$, or $\hat{\lambda}$ may then be used by the estimation block currently computing a update to its assigned element in order to update its assigned element in such a manner as to minimize the KL divergence between surrogate PDF $q(\theta, w, \gamma, \lambda)$ and joint posterior PDF $p(\theta, w, \gamma, \lambda|y)$ according to a predefined criterion, as previously detailed.

Block diagram 200 may also include gain precision hyper-parameter $\gamma$ estimation block 210, which may be configured to compute the estimated gain precision $\hat{\gamma}_i$ for the gain precision hyper-parameters $\gamma$ that are used to condition the prior model for weight vector w. The hyper-parameters $\gamma$ may be defined by a prior model itself (i.e. a hyper-prior), and consequently estimates for $\gamma$ must also be obtained in order to accurately estimate the value of hyper-parameter $\gamma$. Accordingly, channel weight w estimation block 208 may be configured to exchange estimate values with hyper-parameter $\gamma$ estimation block 210.

Prior distributions for each of the channel parameters $\theta$, w, $\lambda$, and $\gamma$ may be defined and utilized to define a joint posterior PDF $p(\theta, w, \gamma, \lambda|y)$ (see Equation 8) that is conditioned on the observations y. This joint posterior PDF may form the basis of the estimation process.

As previously detailed, a surrogate PDF $q(\theta, w, \gamma, \lambda)$ (see Equation 9) may be introduced as an approximation to $p(\theta, w, \gamma, \lambda|y)$. The surrogate PDF $q(\theta, w, \gamma, \lambda)$ may be factorized with the marginal posterior PDFs $q(w)$, $q(\lambda)$, $q(\theta_i)$, and $q(\gamma_i)$ as factors, and may thus offer reduced computational complexity in performing the requisite estimates when compared to operating on $p(\theta, w, \gamma, \lambda|y)$. The associated estimate updates may be calculated by determining the expected value of beliefs $q(w)$, $q(\lambda)$, $q(\theta_i)$, and $q(\gamma_i)$, where beliefs $q(w)$, $q(\lambda)$, $q(\theta_i)$, and $q(\gamma_i)$ satisfy a predetermined criterion that minimizes the KL divergence between surrogate PDF $q(\theta, w, \gamma, \lambda)$ and joint posterior PDF $p(\theta, w, \gamma, \lambda|y)$.

The estimates for each of delays $\theta$, weights w, noise precision $\lambda$, and hyper-parameters $\gamma$ may then be computed by calculating expected values of the beliefs $q(w)$, $q(\lambda)$, $q(\theta_i)$, and $q(\gamma_i)$ of surrogate PDF $q(\theta, w, \gamma, \lambda)$. This may be performed as an iterative process. The estimates for each element $\hat{\theta}_i$, $\hat{w}$, $\hat{\lambda}$, and $\hat{\gamma}_i$ may then be obtained based on the calculation of the expectation of each belief.

While the approximation of the posterior PDF $p(\theta, w, \gamma, \lambda|y)$ with $q(\theta, w, \gamma, \lambda)$ may reduce computational requirements, it nevertheless remains essential to ensure that $q(\theta, w, \gamma, \lambda)$ is an accurate approximation through the estimation of the contained elements. Accordingly, each iterative update of the estimated channel parameters $\hat{\theta}$, $\hat{w}$, $\hat{\lambda}$, and $\hat{\gamma}$ may be performed by minimizing the KL divergence between $q(\theta, w, \gamma, \lambda)$ and $p(\theta, w, \gamma, \lambda|y)$.

Different scheduling schemes dictating the order in which the updates of each element is computed may be implemented. In an exemplary aspect of the disclosure, the estimation process may begin with an empty model containing zero multipath components (i.e. L=0). Multipath components may then be computed and gradually added to the model.

The convergence of variational SBL algorithms may be sped up by considering a particular setting of the parameters a and b for the gain precision hyper-prior $p(\gamma_i)=p_{gam}(\gamma_i; a, b)$, where the hyper-prior $p(\gamma_i)$ is the prior distribution for $\gamma$ used to control the precision parameter $\gamma$ of the weight PDF $p(w_i|\gamma_i)=p_{CN}(w_i; 0, \gamma_i^{-1})$. The convergence time may be reduced by setting the parameters a and b such that a=0 and b=0. However, setting a=0 may affect the ability of the model to add new components (i.e. adding multipath components to the initial estimate of L=0) as well as updating/ removing components from the model during the iterative process. Accordingly, the analysis may be extended by considering any value for a while fixing b=0. This may result in improved model order estimate (i.e. improved estimate of the number of multipath components). Such an improvement may be realized by setting a=1 as opposed to a=0.

The CIR estimation algorithm may thus start out with an empty model, and components may be added, updated, or removed during each iteration. Such a proposed algorithm for update of the associated elements to model the channel impulse response is shown below as pseudocode.

---

Iterative Estimation Algorithm

---

```
Initialize L = 0 and λ̂ = M/y^H y;
repeat                              //outer loop
  Compute parameters for a new component;
  if AddNewComponent = TRUE then    //test whether new component
                                      should be
    Include new component;          //included the model
    L ← L + 1;
  end if
  repeat                            //inner loop
  l = 1;
  while l ≤ L do
    Update q(θ_l) and q(w);
    if KeepComponent = TRUE then    //test if l^th component should
                                      be kept in model
      Update q(y_l) and q(w)
    else
      Remove l^th component;
      L ← L - 1; l ← l - 1;
    end if
  end while
```

| Iterative Estimation Algorithm |
|---|
| Update q(λ) and q(w); |
| until convergence |
| until convergence |

As detailed above, the number of multipath components L (also the model order) is initialized as zero. The noise precision estimate $\hat{\lambda}$ is initially set to M/$y^H$y. The algorithm may then enter the outer loop. The outer loop first computes parameters for a new multipath component to potentially be added to the model, and subsequently tests whether the current model should be augmented with the new component. If the new component should be added to the model, the new component is added, L is incremented to reflect the added component, and the algorithm enters the inner loop.

The inner loop then proceeds to compute appropriate updates to the model variables by updating the respective beliefs q(w), q(λ), q($\theta_i$), and q($\gamma_i$) (the marginal PDFs of each of elements w, $\theta_i$, $\gamma_i$, and λ from the surrogate PDF q($\theta$, w, γ, λ) of Equation 9), as further detailed above. The inner loop of the iterative algorithm may thus iterate through each of the current L model components and update the beliefs q(w), q(λ), q($\theta_i$), and q($\gamma_i$) each iteration.

As detailed in the algorithm above, the CIR estimator may first compute updates for the delay belief q($\theta_i$) and weight belief q(w). The current component is then tested as to whether the component should be kept in the model; if the component is determined to be kept q(w) is updated once again in addition to an update of q($\gamma_i$). Alternatively, the component may be removed from the model.

After all L components have been iteratively updated, q(λ) and q(w) are updated. The inner and outer loops are then repeated until convergence, which may be determined as a maximum number of iterations or relative change of $\hat{\lambda}^{-1}$.

Upon completion, the iterative estimation algorithm may thus yield updated beliefs q(w), q(λ), q($\theta_i$), and q($\gamma_i$), from which estimates $\hat{\theta}_i$, $\hat{w}$, $\hat{\lambda}$, and $\hat{\gamma}_i$ for each of the delays θ, weights w, and noise precisions λ may be obtained based on expected values of each of the beliefs. The resulting estimates may be used to estimate the channel impulse response of the analyzed wireless channel. The model accuracy may be improved through the estimation of the delay values θ using a continuous delay space instead of the existing discretized grid models.

Block diagram 200 may be implemented as one or more circuits, such as e.g. processing circuits. For example, pre-processing block 202, noise precision λ estimation block 204, delay θ estimation block 206, channel weight w estimation block 208, and hyper-parameter γ estimation block 210 may each be implemented as individual circuits.

Figure 3:
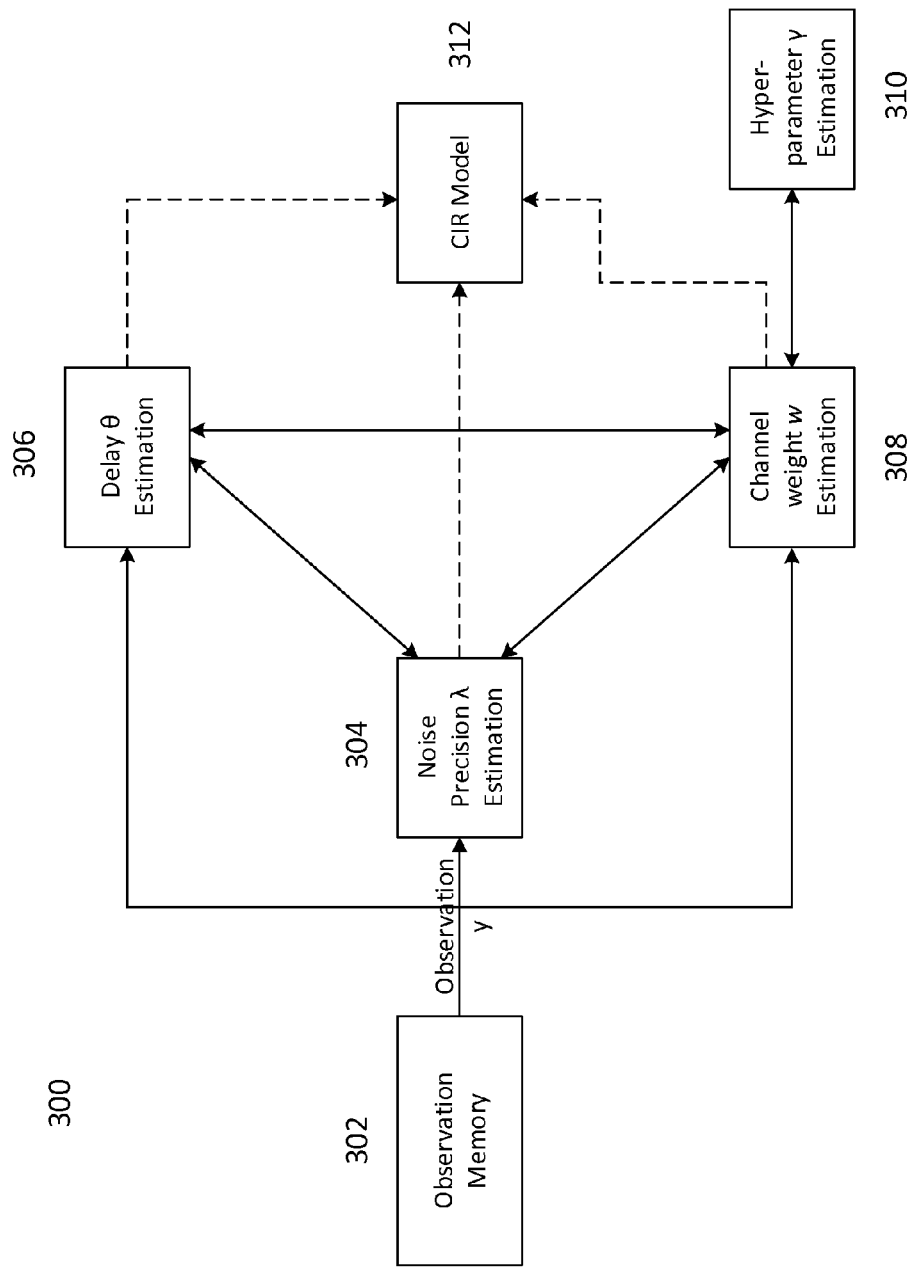
FIG. 3 shows a channel estimation processing circuit according to an exemplary aspect of the disclosure.

An exemplary hardware implementation is detailed in FIG. 3. Channel estimation processing circuit 300 may include observation memory 302, noise precision λ estimation circuit 304, delay θ estimation circuit 306, channel weight w estimation circuit 308, hyper-parameter γ estimation circuit 310, and CIR modeling circuit 312. The aforementioned circuitry and hardware may be implemented as separate circuits, e.g. as separate integrated circuits, as illustrated in FIG. 3. However, it is understood that some or all of the circuits may be implemented by a common programmable processor, such as e.g. a microprocessor. Accordingly, some or all of the functionality of the one or more of the aforementioned components may be consolidated into a single hardware component. It is also understood that channel estimation processing circuit 300 may include a number of additional components, including hardware, processors, memory, and other specialty or generic hardware/processors/circuits, etc., in order to support a variety of additional operations of wireless radio communications. Channel estimation processing circuit 300 may also include a variety of user input/output devices such as displays, keypads, touchscreens, speakers, external buttons, etc.

As will be later described, an additional component may record and determine observations y, which may each be e.g. a received OFDM symbol divided by a corresponding predefined OFDM symbol at the receiver, such as detailed in Equation 6. The resulting observations y may be stored in observation memory 302 for further use in offline processing.

Channel estimation processing circuit 300 may be configured to obtain a channel impulse response estimation by determining estimates for weights w, delays θ, and noise precisions λ associated with the channel model. Accordingly, noise precision λ estimation circuit 304, delay θ estimation circuit 306, channel weight w estimation circuit 308, and hyper-parameter γ estimation circuit 310 may be configured with functionality corresponding to each of noise precision λ estimation block 204, delay θ estimation block 206, channel weight w estimation block 208, and hyper-parameter γ estimation block 210 of FIG. 2, respectively.

Observation memory 302 may thus provide noise precision λ estimation circuit 304, delay θ estimation circuit 306, and channel weight w estimation circuit 308 with observations y. Each of noise precision λ estimation circuit 304, delay θ estimation circuit 306, channel weight w estimation circuit 308, and hyper-parameter γ estimation circuit 310 may thus be configured to perform iterative updates of their respective beliefs based on the received observations y and the remaining beliefs (which are fixed during each iteration) according to the iterative estimation algorithm detailed above.

Following convergence of the model (as defined by a set maximum number of iterations or relative change of inverse noise precision estimate $\hat{\lambda}^{-1}$), each of noise precision λ estimation circuit 304, delay θ estimation circuit 306, and channel weight w estimation circuit 308 may contain an updated value of each of their respective estimated channel parameters. Noise precision λ estimation circuit 304, delay θ estimation circuit 306, and channel weight w estimation circuit 308 may then provide the final parameter estimates $\hat{\theta}_i$, $\hat{w}$, and $\hat{\lambda}$, based on the updated beliefs to CIR modeling circuit 312, which may be e.g. a memory configured to hold the parameter estimates associated with the channel. CIR modeling circuit 312 may thus contain the requisite information to perform channel replay such as e.g. in later VDT simulations.

CIR modeling circuit 312 may be additionally configured to provide control to channel estimation processing circuit 300. For example, channel estimation processing circuit 300 may be configured to iteratively update each of the estimates $\hat{\theta}_i$, $\hat{w}$, $\hat{\lambda}$, and $\hat{\gamma}$ until a certain criterion is reached. For example, CIR modeling circuit 312 may be configured to consistently monitor one of the estimates, such as noise precision estimate $\hat{\lambda}$. CIR modeling circuit 312 may monitor the relative change of noise precision estimate $\hat{\lambda}$, i.e. the amount that noise precision estimate $\hat{\lambda}$ changes over one or more iteration cycles. If noise precision estimate $\hat{\lambda}$ is only changing a minimal amount between updates, CIR modeling circuit 312 may be configured to determine that further iterative updates to estimates $\hat{\theta}_i$, $\hat{\theta}$, $\hat{\lambda}$, and $\hat{\gamma}$ are no longer needed, and the iterative update process should end. For example, CIR modeling circuit 312 may calculate the relative change of noise precision estimate $\hat{\lambda}$ over a period of time or a number of iterative updates, and compare the relative change to a threshold. If the relative change falls below the threshold, CIR modeling circuit 312 may terminate the iterative update process, such as by e.g. controlling noise precision $\lambda$ estimation circuit 304, delay $\theta$ estimation circuit 306, channel weight w estimation circuit 308, and hyper-parameter $\gamma$ estimation circuit 310 to cease computing updates. The channel estimation may then end, with CIR modeling circuit 312 containing the final estimate values for $\hat{\theta}_i$, $\hat{w}$, and $\hat{\lambda}$.

Alternatively, channel estimation processing circuit 300 may be configured to perform only a certain number of iterative updates before determining final estimate values for $\hat{\theta}_i$, $\hat{w}$, and $\hat{\lambda}$. CIR modeling circuit 312 may thus act as a controller, and may be configured to monitor the number of total iterations performed by channel estimation processing circuit 300. CIR modeling circuit 312 may be configured to control noise precision $\lambda$ estimation circuit 304, delay $\theta$ estimation circuit 306, channel weight w estimation circuit 308, and hyper-parameter $\gamma$ estimation circuit 310 to cease computing updates once the number of total iterations has been reached.

Figure 4:
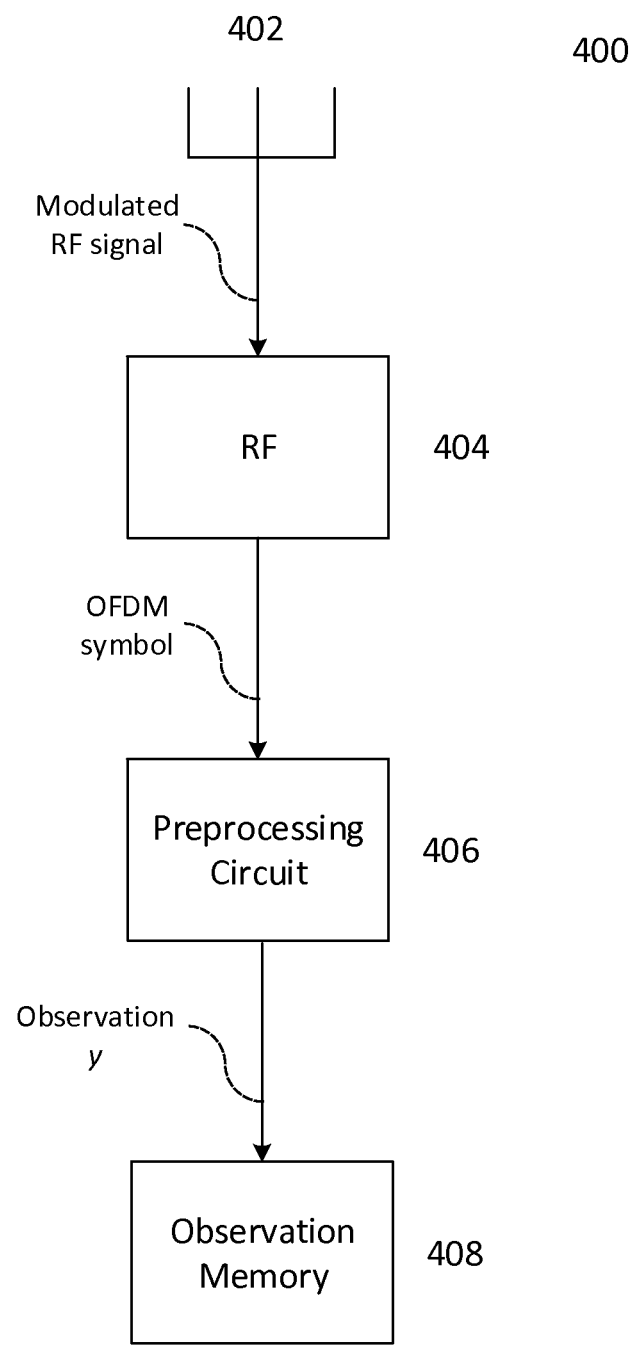
FIG. 4 shows an OFDM receiver according to an exemplary aspect of the disclosure.

An additional device may be provided in order to obtain the observations y contained in observation memory 302. An exemplary implementation is shown in FIG. 4. OFDM receiver 400 may include antenna 402, RF receiver 404, preprocessing circuit 406, and observation memory 408.

OFDM receiver 400 may be configured to receive and process radio frequency OFDM symbols in order to obtain observations y, which then may be provided to channel estimation processing circuit 300 of FIG. 3 in order to determine a channel impulse response estimate.

Accordingly, OFDM receiver 400 may receive wireless radio frequency signals over antenna 402. Antenna 402 may be implemented as either a single antenna or an antenna array, such as e.g. for use in Multiple Input Multiple Output (MIMO) communications. Antenna 402 may receive wireless radio frequency signals and provide resulting electrical radio frequency signals to RF receiver 404. RF receiver 400 may digitize and demodulate the received radio frequency signals to obtain one or more baseband OFDM symbols. RF receiver 404 may then provide the OFDM symbols to preprocessing circuit 406.

Preprocessing circuit 406 may then remove the cyclic prefix from the received OFDM symbols, perform a Discrete Fourier Transform (e.g. in order to complete the demodulation process associated with OFDM reception), and divide the resulting symbol by a corresponding predefined OFDM pilot symbol. The functionality of preprocessing circuit 406 may thus be substantially similar to preprocessing block 202 of block diagram 200. Preprocessing circuit 406 may thus therefore produce observations y for use by channel estimation processing circuit 300.

Observations y may then be stored in observation memory 408. Observation memory 408 may thus be configured to hold a plurality of observations. The plurality of observations may then be later utilized in order to obtain a channel impulse response estimate.

For example, observation memory 408 may be utilized as observation memory 302 of channel estimation processing circuit 300. Observations y may thus be provided to noise precision $\lambda$ estimation circuit 304, delay $\theta$ estimation circuit 306, and channel weight w estimation circuit 308 for use in determining a noise estimate, delay estimate, and channel weight estimate in order to characterize the channel impulse response.

The resulting channel impulse response estimates may then be used in a variety of applications, including the aforementioned Virtual Drive Testing scenarios. VDT implementations may constitute offline processing, where the observation vector y is determined based on OFDM pilot symbols recorded during field drive tests. The obtained observation vector may then be evaluated according to the above-described channel estimation methods in order to arrive at an estimated channel impulse response. The resulting channel impulse response may then be used for channel replay, such as in an anechoic OTA testing chamber used to simulate wireless networks. The simulations may be utilized in order to perform testing on various wireless equipment that may otherwise require field testing.

Figure 5:
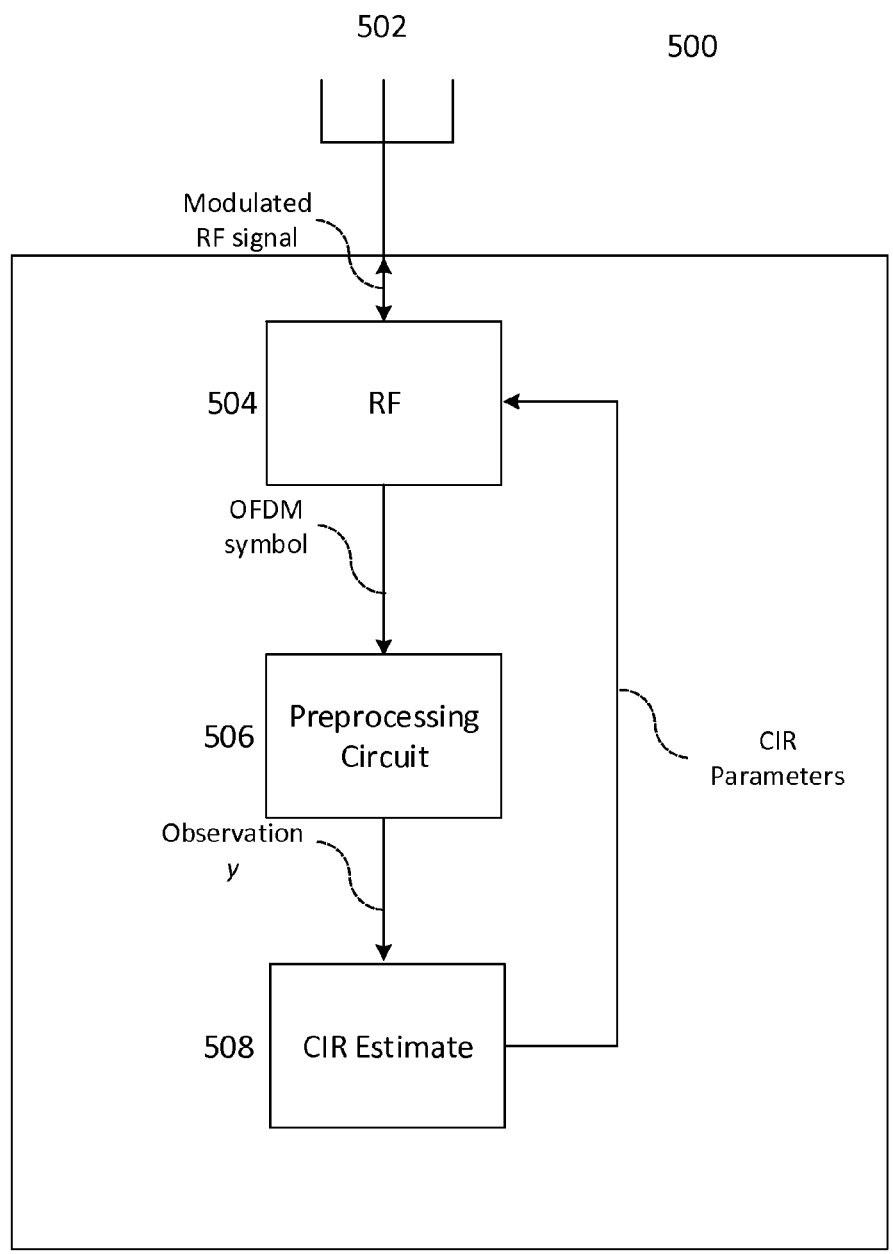
FIG. 5 shows a mobile terminal according to an exemplary aspect of the disclosure.

The above-detailed examples may also be implemented as an online process, i.e. in a mobile terminal during real-time use. FIG. 5 shows mobile terminal 500, which includes antenna 502, RF transceiver 504, preprocessing circuit 506, and CIR estimation circuit 508. The aforementioned circuitry and hardware may be implemented as separate circuits, e.g. as separate integrated circuits, as illustrated in FIG. 5. However, it is understood that some or all of the circuits may be implemented by a common programmable processor, such as e.g. a microprocessor. Accordingly, some or all of the functionality of the one or more of the aforementioned components may be consolidated into a single hardware component. It is also understood that channel estimation processing circuit 300 may include a number of additional components, including hardware, processors, memory, and other specialty or generic hardware/processors/circuits, etc., in order to support a variety of additional operations of wireless radio communications. Mobile terminal 500 may also include a variety of user input/output devices such as displays, keypads, touchscreens, speakers, external buttons, etc.

Similarly to as detailed regarding FIG. 4, antenna 502 may receive wireless radio frequency signals and provide resulting electrical radio frequency signals to RF transceiver 504. RF transceiver 504 may then receive and process the resulting electrical radio frequency signals, such as e.g. by digitizing the resulting electrical radio frequency signals. The received signals may be OFDM symbols, such as OFDM pilot symbols transmitted by a base station. RF transceiver 504 may then provide the resulting baseband signals to preprocessing circuit 506.

RF transceiver 504 may be additionally configured to transmit radio frequency signals, such as e.g. by modulating baseband signals onto a radio frequency carrier signal and providing the resulting radio frequency signals to antenna 502 for wireless transmission. Mobile terminal 500 may thus perform wireless communications with other wireless communication devices using RF transceiver 504 and antenna 502.

RF transceiver 504 may thus provide baseband OFDM symbols to preprocessing circuit. Preprocessing circuit 506 may then process the received OFDM symbols in order to produce observations for use in estimating the channel, by e.g. removing the cyclic prefix, performing a discrete Fourier transform, and dividing by a corresponding predefined OFDM pilot symbol. Preprocessing circuit 506 may thus produce observations y to CIR estimation circuit 508.

CIR estimation circuit 508 may then compute an estimated channel impulse response based on the received observations y. CIR estimation circuit 508 may be configured similarly to channel estimation processing circuit 300, and may receive observations y from preprocessing circuit 506 as opposed to an observation memory. CIR estimation circuit 508 may then utilize the received observations y in order to estimate the channel impulse response of the wireless channel that the OFDM symbols were received over.

CIR estimation circuit 508 may thus iteratively update each of a noise precision estimate $\hat{\lambda}$, a plurality of delay estimates $\hat{\theta}$, and a plurality of channel weight estimates $\hat{w}$. CIR estimation circuit 508 may thus contain a noise precision estimation circuit, delay estimation circuit, and channel weight estimation circuit similar to noise precision $\lambda$ estimation circuit 304, delay $\theta$ estimation circuit 306, channel weight w estimation circuit 308 of channel estimation processing circuit 300.

CIR estimation circuit 508 may additionally include a hyper-parameter $\gamma$ estimation circuit, e.g. similar to hyper-parameter $\gamma$ estimation circuit 310. CIR estimation circuit 508 may utilize the hyper-parameter $\gamma$ estimation circuit in order to estimate a gain precision $\hat{\gamma}$ for use in updating channel weight estimates $\hat{w}$.

CIR estimation circuit 508 may thus generate an estimated channel impulse response. The estimated channel impulse response may include a plurality of multipath components, where each of the plurality of multipath components is associated with a channel weight estimate and a multipath delay estimate. The estimated channel impulse response may further include a noise precision estimate, which may be used to estimate the noise present in the channel.

CIR estimation circuit 508 may then provide the estimated channel impulse response to RF transceiver 504, e.g. in the form of the channel impulse response parameters: estimated channel gain values, estimated multipath delay values, and estimated noise precision. RF transceiver 504 may then utilize the estimated channel impulse response provided by CIR estimation circuit 508 to receive and/or transmit signals on the wireless channel. For example, RF transceiver 504 may receive further radio frequency signals over the wireless channel which the estimated channel impulse response is based on. RF transceiver 504 may process the received radio frequency signals according to the estimated channel impulse response, thereby effectively accounting for channel effects. RF transceiver 504 may obtain higher reception performance when using the estimated channel impulse response to receive wireless signals over the wireless channel.

Alternatively, a separate component (not shown) may be provided internal to mobile terminal 500 which CIR estimation circuit 508 may provide the estimated channel impulse response to. The separate component may be configured to perform processing on received signals, such as e.g. after being provided with received signals by RF transceiver 504.

RF transceiver 504 may additionally use the estimated channel impulse response in order to perform transmission of signals. This may be particularly useful in a scenario with a duplexing scheme that offers channel reciprocity between the uplink and downlink channels, such as e.g. a Time Division Duplexing scheme. RF transceiver 504 may be provided with signals intended for uplink transmission, e.g. from another mobile communication processing component of mobile terminal 500 (not shown). RF transceiver 504 may then perform processing on the signals intended for uplink transmission before providing them to antenna 502. RF transceiver 504 may thus be able to preemptively compensate for wireless channel effects through the use of the estimated channel impulse response, thereby performing higher quality uplink transmissions.

Figure 6:
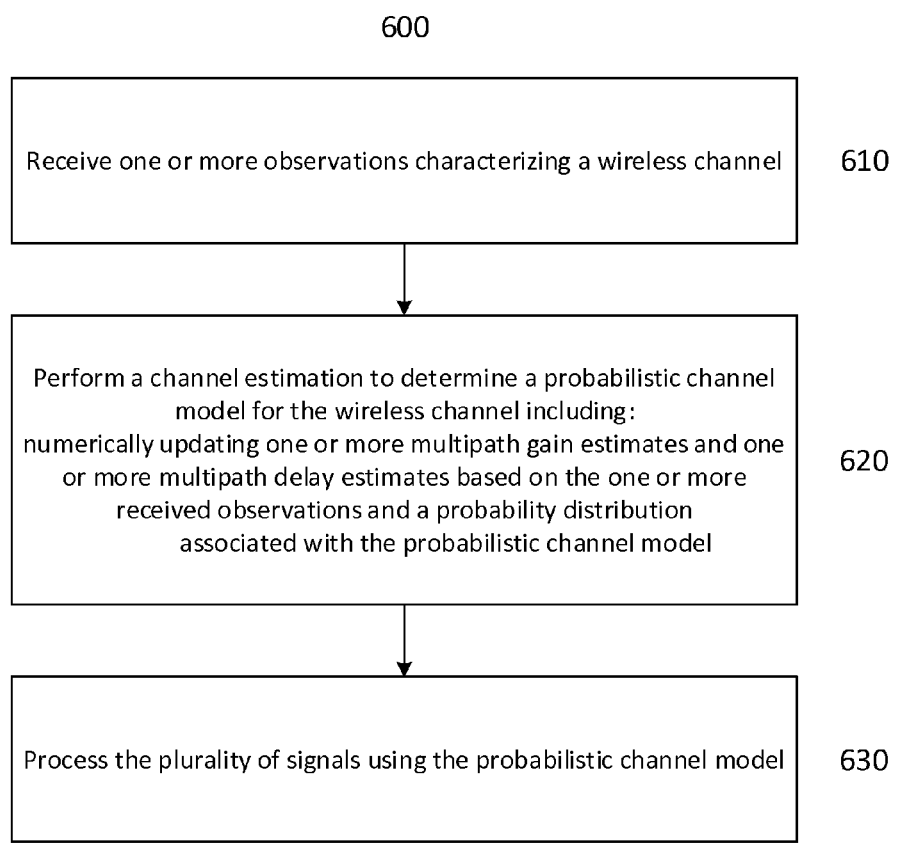
FIG. 6 shows a flow diagram illustrating a method of processing a plurality of signals according an exemplary aspect of the disclosure.

FIG. 6 shows a process 600 for processing a plurality of signals according to an exemplary aspect of the disclosure. In 610, process 600 may receive one or more observations characterizing a wireless channel. Process 600 may then perform a channel estimation to determine a probabilistic channel model for the wireless channel in 620. The channel estimation may include numerically updating one or more multipath gain estimates and one or more multipath delay estimates based on the one or more received observations and a probability distribution associated with the probabilistic channel model. Process 600 may then process the plurality of signals using the probabilistic channel model in 630. Process 600 may process the plurality of signals using the probabilistic channel model e.g. by artificially recreating the wireless channel using the an estimated channel impulse response for a Virtual Drive Test. Alternatively, process 600 may be implemented e.g. in a mobile terminal, and may be utilized to process incoming or outgoing communication signals in order to compensate for wireless channel effects.

Figure 7:
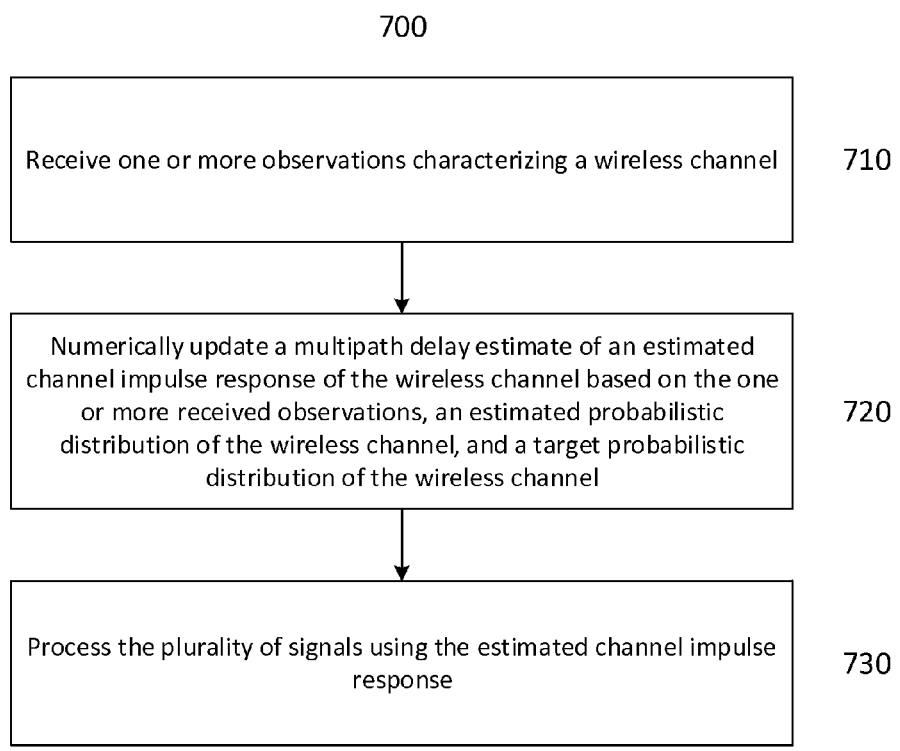
FIG. 7 shows a flow diagram illustrating a method of processing a plurality of signals according another exemplary aspect of the disclosure.

FIG. 7 shows a process 700 for processing a plurality of signals according to another exemplary aspect of the disclosure. In 710, process 700 may receive one or more observations characterizing a wireless channel. Process 700 may then numerically update a multipath delay estimate of an estimated channel impulse response of the wireless channel based on the one or more received observations, an estimated probabilistic distribution of the wireless channel, and a target probabilistic distribution of the wireless channel in 720. Process 700 may then process the plurality of signals using the estimated channel impulse response in 730. Process 700 may process the plurality of signals using the probabilistic channel model e.g. by artificially recreating the wireless channel using the an estimated channel impulse response for a Virtual Drive Test. Alternatively, process 700 may be implemented e.g. in a mobile terminal, and may be utilized to process incoming or outgoing communication signals in order to compensate for wireless channel effects.

The following examples pertain to further aspects of this disclosure:

Example 1 is a method for processing a plurality of digital signals. The method includes receiving one or more observations characterizing a wireless channel; performing a channel estimation to determine a probabilistic channel model for the wireless channel; and processing the plurality of signals using the probabilistic channel model. The channel estimation includes numerically updating one or more multipath gain estimates and one or more multipath delay estimates based on the one or more received observations and a probability distribution associated with the probabilistic channel model.

In Example 2, the subject matter of Example 1 can optionally include wherein the probabilistic channel model is an estimated channel impulse response including the one or more multipath gain estimates and the one or more multipath delay estimates.

In Example 3, the subject matter of Example 2 can optionally include wherein the estimated channel impulse response further includes a noise precision estimate, and wherein the processing the plurality of signals using the probabilistic channel model includes processing the plurality of signals using the estimated channel impulse response.

In Example 4, the subject matter of Example 3 can optionally include wherein the processing the plurality of signals using the estimated channel impulse response includes processing the plurality of signals using the one or more multipath gain estimates and the one or more multipath delay estimates of the estimated channel impulse response.

In Example 5, the subject matter of Example 3 can optionally include wherein the estimated channel impulse response further includes a noise precision estimate, and wherein the processing the plurality of signals using the estimated channel impulse response includes processing the plurality of signals using the one or more multipath gain estimates, the one or more multipath delay estimates of the estimated channel impulse response, and the noise precision estimate.

In Example 6, the subject matter of Example 3 can optionally include wherein the processing the plurality of signals using the estimated channel impulse response includes artificially recreating the wireless channel using the plurality of signals and the estimated channel impulse response during a Virtual Drive Test.

In Example 7, the subject matter of Example 3 can optionally include wherein the processing the plurality of signals using the estimated channel impulse response includes receiving the plurality of signals over the wireless channel; and processing the plurality of received signals using the estimated channel impulse response.

In Example 8, the subject matter of Example 2 can optionally include wherein the estimated channel impulse response includes one or more multipath component models, and wherein each of the one or more multipath gain estimates and each of the multipath delay estimates are associated with a respective multipath component model of the one or more multipath component models.

In Example 9, the subject matter of Example 8 can optionally include wherein the channel estimation includes determining a new multipath component model; evaluating the new multipath component model based on the one or more received observations to generate an evaluation result; and adding the new multipath component model to the one or more multipath component models based on the evaluation result.

In Example 10, the subject matter of Example 8 can optionally include wherein each of the one or more multipath component models estimate a multipath propagation channel of the wireless channel according to the multipath gain estimate and multipath delay estimate associated with each of the one or more multipath component models.

In Example 11, the subject matter of Example 8 can optionally include wherein the processing the plurality of signals using the probabilistic channel model includes processing the plurality of signals using the one or more multipath gain estimates and the one or more multipath delay estimates of the estimated channel impulse response.

In Example 12, the subject matter of Example 2 can optionally include wherein the estimated channel impulse response further includes a noise precision estimate.

In Example 13, the subject matter of Example 12 can optionally include wherein the noise precision estimate is an estimate of the inverse of the variance of zero-mean complex Gaussian noise in the wireless channel.

In Example 14, the subject matter of Example 1 can optionally include wherein the channel estimation further includes numerically updating a noise precision estimate based on the one or more received observations and the probability distribution associated with the probabilistic channel model.

In Example 15, the subject matter of Example 14 can optionally include wherein the numerically updating a noise precision estimate based on the one or more received observations and the probability distribution associated with the probabilistic channel model includes determining an expected value based on the probability distribution associated with the probabilistic channel model in order to update the noise precision estimate.

In Example 16, the subject matter of Example 14 can optionally include wherein the numerically updating the one or more multipath gain estimates based on the one or more received observations and a probability distribution associated with the probabilistic channel model includes determining an expected value based on the probability distribution associated with the probabilistic channel model in order to update the one or more multipath gain estimates.

In Example 17, the subject matter of Example 14 can optionally include wherein the numerically updating the one or more multipath delay estimates based on the one or more received observations and a probability distribution associated with the probabilistic channel model includes determining an expected value based on the probability distribution associated with the probabilistic channel model in order to update the one or more multipath delay estimates.

In Example 18, the subject matter of Example 14 can optionally include wherein the numerically updating the one or more multipath gain estimates, the one or more multipath delay estimates, and the noise precision estimate associated with the probabilistic channel model includes selecting the one or more multipath gain estimates, the one or more multipath delay estimates, or the noise precision estimate to be updated; and updating the selected estimates based on the remaining non-selected estimates.

In Example 19, the subject matter of Example 18 can optionally include wherein the updating the selected estimates based on the remaining non-selected estimates includes calculating an expected value of the selected estimates based on the remaining non-selected estimates.

In Example 20, the subject matter of Example 14 can optionally include wherein the probability distribution associated with the probabilistic channel model is an estimated joint probability distribution.

In Example 21, the subject matter of Example 20 can optionally include wherein the estimated joint probability distribution is conditioned on the one or more received observations.

In Example 22, the subject matter of Example 20 can optionally include wherein the numerically updating the one or more multipath gain estimates, the one or more multipath delay estimates, and the noise precision estimate associated with the probabilistic channel model includes numerically updating the one or more multipath gain estimates, the one or more multipath delay estimates, and the noise precision estimate associated with the probabilistic channel model based on minimizing a probabilistic divergence between the estimated joint probability distribution and a joint posterior probability distribution associated with the wireless channel.

In Example 23, the subject matter of Example 22 can optionally include wherein the probabilistic divergence is a Kullback-Leibler divergence between the estimated joint probability distribution and a joint posterior probability distribution associated with the wireless channel.

In Example 24, the subject matter of Example 20 can optionally include wherein the numerically updating the one or more multipath delay estimates includes numerically updating the one or more multipath delay estimates based on minimizing a probabilistic divergence between the estimated joint probability distribution and a joint posterior probability distribution associated with the wireless channel.

In Example 25, the subject matter of Example 24 can optionally include wherein the numerically updating the one or more multipath delay estimates further includes calculating the expected value of a mixture of probability distributions to generate a multipath delay estimate of the one or more multipath delay estimates.

In Example 26, the subject matter of Example 25 can optionally include wherein the calculating the expected value of a mixture of probability distributions to generate a multipath delay estimate of the one or more multipath delay estimates is based on the one or more multipath gain estimates and the noise precision estimate.

In Example 27, the subject matter of Example 25 can optionally include wherein the mixture of probability distributions are a mixture of von Mises probability distributions, and wherein the numerically updating the one or more multipath delay estimates further includes calculating the mixture of von Mises probability distributions to approximate the product of a plurality of wrapped von Mises probability distributions.

In Example 28, the subject matter of Example 1 can optionally include wherein the numerically updating one or more multipath delay estimates associated with the probabilistic channel model based on the one or more received observations and a probability distribution associated with the probabilistic channel model includes calculating the expected value of a mixture of probability distributions to generate a multipath delay estimate of the one or more multipath delay estimates.

In Example 29, the subject matter of Example 28 can optionally include wherein the calculating the expected value of a mixture of probability distributions to generate a multipath delay estimate of the one or more multipath delay estimates is based on the one or more multipath gain estimates and the noise precision estimate.

In Example 30, the subject matter of Example 28 can optionally include wherein the mixture of probability distributions are a mixture of von Mises probability distributions, and wherein the numerically updating the one or more multipath delay estimates further includes calculating the mixture of von Mises probability distributions to approximate the product of a plurality of wrapped von Mises probability distributions.

In Example 31, the subject matter of Example 1 can optionally include wherein the numerically updating one or more multipath gain estimates associated with the probabilistic channel model based on the one or more received observations and a probability distribution associated with the probabilistic channel model includes numerically updating the one or more multipath gain estimates based on the one or more received observations, a probability distribution associated with the probabilistic channel model, and one or more estimated gain precisions.

In Example 32, the subject matter of Example 31 can optionally include wherein the channel estimation further includes numerically updating the one or more estimated gain precisions based on the probability distribution associated with the probabilistic channel model and the one or more multipath gain estimates.

In Example 33, the subject matter of Example 31 can optionally include wherein the numerically updating the one or more multipath gain estimates based on the one or more received observations, a probability distribution associated with the probabilistic channel model, and one or more estimated gain precisions includes calculating an expected value based on the probability distribution associated with the probabilistic channel model in order to numerically update the one or more multipath gain estimates.

In Example 34, the subject matter of Example 1 can optionally include wherein the one or more observations are based on one or more pilot symbols received over the wireless channel.

In Example 35, the subject matter of Example 34 can optionally include wherein the one or more pilot symbols are OFDM pilot symbols.

In Example 36, the subject matter of Example 1 can optionally include processing a plurality of pilot symbols received over the wireless channel to generate the one or more observations.

In Example 37, the subject matter of Example 36 can optionally include wherein the processing a plurality of pilot symbols includes performing cyclic prefix removal; performing a discrete Fourier transform; and dividing each of the plurality of pilot symbols by a predefined respective pilot symbol.

In Example 38, the subject matter of Example 1 can optionally include wherein the numerically updating one or more multipath gain estimates and one or more multipath delay estimates associated with the probabilistic channel model includes iteratively updating the multipath gain estimates and the multipath delay estimates associated with the probabilistic channel model until a termination criterion is reached.

In Example 39, the subject matter of Example 38 can optionally include wherein the termination criterion is a threshold number of iterations.

In Example 40, the subject matter of Example 38 can optionally include wherein the channel estimation further includes numerically updating a noise precision estimate associated with the probabilistic channel model based on the one or more received observations and a probability distribution associated with the probabilistic channel model; and determining the relative change in the noise precision estimate over one or more numerical updates of the noise precision estimate; and wherein the termination criterion is a relative change threshold of the noise precision estimate.

Example 41 is a signal processing device. The signal processing device includes a multipath gain estimation circuit configured to numerically update one or more multipath gain estimates of a probabilistic channel model of a wireless channel based on one or more received observations characterizing the wireless channel and a probability distribution associated with the probabilistic channel model; a multipath delay estimation circuit configured to numerically update one or more multipath delay estimates based on the one or more received observations characterizing the wireless channel and the probability distribution associated with the probabilistic channel model; and a signal processing circuit configured to process a plurality of signals using the probabilistic channel model.

In Example 42, the subject matter of Example 41 can optionally include wherein the probabilistic channel model is an estimated channel impulse response includes the one or more multipath gain estimates and the one or more multipath delay estimates.

In Example 43, the subject matter of Example 42 can optionally include wherein the estimated channel impulse response further includes a noise precision estimate, and wherein the signal processing circuit is configured to process a plurality of signals using the probabilistic channel model by processing the plurality of signals using the estimated channel impulse response.

In Example 44, the subject matter of Example 43 can optionally include wherein the signal processing circuit is configured to process the plurality of signals using the estimated channel impulse response by processing the plurality of signals using the one or more multipath gain estimates and the one or more multipath delay estimates of the estimated channel impulse response.

In Example 45, the subject matter of Example 43 can optionally include a noise precision estimation circuit configured to estimate a noise precision estimate, wherein the estimate channel impulse response further includes the noise precision estimate, and wherein the signal processing circuit is configured to process the plurality of signals using the estimated channel impulse response by processing the plurality of signals using the one or more multipath gain estimates, the one or more multipath delay estimates of the estimated channel impulse response, and the noise precision estimate.

In Example 46, the subject matter of Example 43 can optionally include wherein the signal processing circuit is configured to process the plurality of signals using the estimated channel impulse response by artificially recreating the wireless channel using the plurality of signals and the estimated channel impulse response during a Virtual Drive Test.

In Example 47, the subject matter of Example 43 can optionally include a receiver configured to receive the plurality of signals over the wireless channel; and wherein the signal processing circuit is configured to process the plurality of signals using the estimated channel impulse response by processing the plurality of received signals using the estimated channel impulse response.

In Example 48, the subject matter of Example 42 can optionally include wherein the estimated channel impulse response includes one or more multipath component models, and wherein each of the one or more multipath gain estimates and each of the multipath delay estimates are associated with a respective multipath component model of the one or more multipath component models.

In Example 49, the subject matter of Example 48 can optionally include a channel model control circuit configured to determine a new multipath component model including a multipath gain estimate and a multipath delay estimate; evaluate the new multipath component model based on the one or more received observations to generate an evaluation result; and add the new multipath component model to the one or more multipath component models based on the evaluation result.

In Example 50, the subject matter of Example 48 can optionally include wherein each of the one or more multipath component models estimate a multipath propagation channel of the wireless channel according to the multipath gain estimate and multipath delay estimate associated with each of the one or more multipath component models.

In Example 51, the subject matter of Example 48 can optionally include wherein the signal processing circuit is configured to process a plurality of signals using the probabilistic channel model by processing the plurality of signals using the one or more multipath gain estimates and the one or more multipath delay estimates of the estimated channel impulse response.

In Example 52, the subject matter of Example 42 can optionally include wherein the estimated channel impulse response further includes a noise precision estimate.

In Example 53, the subject matter of Example 42 can optionally include wherein the noise precision estimate is an estimate of the inverse of the variance of zero-mean complex Gaussian noise in the wireless channel.

In Example 54, the subject matter of Example 41 can optionally include a noise precision estimation circuit configured to numerically update a noise precision estimate based on the one or more received observations and the probability distribution associated with the probabilistic channel model.

In Example 55, the subject matter of Example 54 can optionally include wherein the noise precision estimation circuit is configured to numerically update the noise precision estimate by determining an expected value based on the probability distribution associated with the probabilistic channel model in order to update the noise precision estimate.

In Example 56, the subject matter of Example 54 can optionally include wherein the multipath gain estimation circuit is configured to numerically update the one or more multipath gain estimates by determining an expected value based on the probability distribution associated with the probabilistic channel model in order to update the one or more multipath gain estimates.

In Example 57, the subject matter of Example 54 can optionally include wherein the multipath delay estimation circuit is configured to numerically update the one or more multipath delay estimates by determining an expected value based on the probability distribution associated with the probabilistic channel model in order to update the one or more multipath delay estimates.

In Example 58, the subject matter of Example 41 can optionally include wherein the multipath gain estimation circuit, multipath delay estimation circuit, and noise precision estimation circuit are configured to iteratively update the respective one or more multipath gain estimates, one or more multipath delay estimates, or noise precision estimate based on the other non-respective estimates.

In Example 59, the subject matter of Example 58 can optionally include wherein the multipath gain estimation circuit, multipath delay estimation circuit, and noise precision estimation circuit are configured to iteratively update the respective one or more multipath gain estimates, one or more multipath delay estimates, or noise precision estimate based on the other non-respective estimates by calculating an expected value of the selected estimates based on the remaining non-selected estimates and the probability distribution associated with the probabilistic channel model.

In Example 60, the subject matter of Example 54 can optionally include wherein the probability distribution associated with the probabilistic channel model is an estimated joint probability distribution.

In Example 61, the subject matter of Example 60 can optionally include wherein the estimated joint probability distribution is conditioned on the one or more received observations.

In Example 62, the subject matter of Example 60 can optionally include wherein the multipath gain estimation circuit is configured to numerically update the one or more multipath gain estimates by numerically updating the one or more multipath gain estimates based on minimizing a probabilistic divergence between the estimated joint probability distribution and a joint posterior probability distribution associated with the wireless channel.

In Example 63, the subject matter of Example 62 can optionally include wherein the probabilistic divergence is a Kullback-Leibler divergence between the estimated joint probability distribution and a joint posterior probability distribution associated with the wireless channel.

In Example 64, the subject matter of Example 60 can optionally include wherein the multipath delay estimation circuit is configured to numerically update the one or more multipath delay estimates by numerically updating the one or more multipath delay estimates based on minimizing a probabilistic divergence between the estimated joint probability distribution and a joint posterior probability distribution associated with the wireless channel.

In Example 65, the subject matter of Example 64 can optionally include wherein the multipath delay estimation circuit is configured to numerically update the one or more multipath delay estimates by calculating the expected value of a mixture of probability distributions to generate a multipath delay estimate of the one or more multipath delay estimates.

In Example 66, the subject matter of Example 65 can optionally include wherein the calculating the expected value of a mixture of probability distributions to generate a multipath delay estimate of the one or more multipath delay estimates is based on the one or more multipath gain estimates and the noise precision estimate.

In Example 67, the subject matter of Example 65 can optionally include wherein the mixture of probability distributions are a mixture of von Mises probability distributions, and wherein the multipath delay estimation circuit is further configured to numerically update the one or more multipath delay estimates by calculating the mixture of von Mises probability distributions to approximate the product of a plurality of wrapped von Mises probability distributions.

In Example 68, the subject matter of Example 41 can optionally include wherein the multipath delay estimation circuit is configured to numerically update the one or more multipath delay estimates by calculating the expected value of a mixture of probability distributions to generate a multipath delay estimate of the one or more multipath delay estimates.

In Example 69, the subject matter of Example 68 can optionally include wherein the multipath delay estimation circuit is configured to calculate the expected value of a mixture of probability distributions to generate a multipath delay estimate of the one or more multipath delay estimates based on the one or more multipath gain estimates and the noise precision estimate.

In Example 70, the subject matter of Example 68 can optionally include wherein the mixture of probability distributions are a mixture of von Mises probability distributions, and wherein the multipath delay estimation circuit is configured to numerically update the one or more multipath delay estimates by calculating the mixture of von Mises probability distributions to approximate the product of a plurality of wrapped von Mises probability distributions.

In Example 71, the subject matter of Example 41 can optionally include wherein the multipath gain estimation circuit is configured to numerically update the one or more multipath gain estimates by numerically updating the one or more multipath gain estimates based on the one or more received observations, a probability distribution associated with the probabilistic channel model, and an estimated gain precision.

In Example 72, the subject matter of Example 71 can optionally include a gain precision estimation circuit configured to numerically update the estimated gain precision based on the probability distribution associated with the probabilistic channel mode and the one or more multipath gain estimates.

In Example 73, the subject matter of Example 71 can optionally include wherein the multipath gain estimation circuit is configured to numerically update the one or more multipath gain estimates by calculating an expected value based on the probability distribution associated with the probabilistic channel model in order to numerically update the one or more multipath gain estimates.

In Example 74, the subject matter of Example 41 can optionally include wherein the one or more observations are based on one or more pilot symbols received over the wireless channel.

In Example 75, the subject matter of Example 74 can optionally include wherein the one or more pilot symbols are OFDM pilot symbols.

In Example 76, the subject matter of Example 75 can optionally include a receiver configured to receive the plurality of pilot symbols over the wireless channel; and a preprocessing circuit configured to process the received plurality of pilot symbols to generate the one or more observations.

In Example 77, the subject matter of Example 76 can optionally include wherein the preprocessing circuit is configured to perform cyclic prefix removal on the plurality of received pilot symbols; perform a discrete Fourier transform on the plurality of received pilot symbols; and divide each of the plurality of pilot symbols by a predefined respective pilot symbol.

In Example 78, the subject matter of Example 41 can optionally include wherein the multipath gain estimation circuit and multipath delay estimation circuit are configured to numerically update the one or more multipath gain estimates and the one or more multipath delay estimates by iteratively updating the multipath gain estimates and the multipath delay estimates until a termination criterion is reached.

In Example 79, the subject matter of Example 78 can optionally include wherein the termination criterion is a threshold number of total iterations.

In Example 80, the subject matter of Example 78 can optionally include a noise precision estimation circuit configured to numerically update a noise precision estimate associated with the probabilistic channel model based on the one or more received observations and a probability distribution associated with the probabilistic channel model; and a channel model control circuit configured to determine the relative change in the noise precision estimate over one or more numerical updates of the noise precision estimate, and wherein the termination criterion is a relative change threshold of the noise precision estimate.

Example 81 is a method for processing a plurality of signals. The method includes receiving one or more observations characterizing a wireless channel; updating a multipath delay estimate of an estimated channel impulse response of the wireless channel based on the one or more received observations, an estimated probabilistic distribution of the wireless channel, and a target probabilistic distribution of the wireless channel; and processing the plurality of signals using the estimated channel impulse response.

In Example 82, the subject matter of Example 81 can optionally include wherein the numerically updating a multipath delay estimate of an estimated channel impulse response numerically updating the multipath delay estimate based on a probabilistic divergence between the estimated probabilistic distribution and the target probabilistic distribution.

In Example 83, the subject matter of Example 82 can optionally include wherein the probabilistic divergence is a Kullback-Leibler divergence between the estimated joint probability distribution and a joint posterior probability distribution associated with the wireless channel.

In Example 84, the subject matter of Example 82 can optionally include wherein the numerically updating the multipath delay estimate based on a probabilistic divergence numerically updating the multipath delay estimate in order to minimize the probabilistic divergence between the estimated probabilistic distribution and the target probabilistic distribution.

In Example 85, the subject matter of Example 82 can optionally include wherein the numerically updating a multipath delay estimate calculating an expected value of the multipath delay estimate, numerically updating the multipath delay estimate to be the expected value of the multipath delay estimate.

In Example 86, the subject matter of Example 85 can optionally include wherein the calculating an expected value of the multipath delay estimate calculating the expected value of a mixture of von Mises probabilistic distributions.

In Example 87, the subject matter of Example 86 can optionally include wherein the calculating an expected value of the multipath delay estimate further includes calculating the mixture of von Mises probabilistic distributions to approximate the product of a plurality of wrapped von Mises probabilistic distributions.

In Example 88, the subject matter of Example 81 can optionally include wherein the estimated channel impulse response includes one or more multipath delay estimates, one or more multipath gain estimates, and a noise precision estimate, and wherein the one or more multipath delay estimates includes the multipath delay estimate.

In Example 89, the subject matter of Example 88 can optionally include wherein the numerically updating the multipath delay estimate calculating an updated delay estimate as the multipath delay estimate based on the one or more received observations, the one or more multipath gain estimates, and the noise precision estimate.

In Example 90, the subject matter of Example 89 can optionally include wherein the calculating an updated delay estimate as the multipath delay estimate includes calculating an updated delay estimate as the multipath delay estimate based on the one or more received observations, the one or more multipath gain estimates, and the noise precision estimate in order to minimize the probabilistic divergence between the estimated probabilistic distribution and the target probabilistic distribution.

In Example 91, the subject matter of Example 90 can optionally include wherein the calculating an updated delay estimate as the multipath delay estimate includes calculating an expected value of a multipath delay probabilistic distribution as the updated delay estimate, and further including setting the multipath delay estimate as the updated delay estimate.

In Example 92, the subject matter of Example 91 can optionally include wherein the estimated probabilistic distribution includes the multipath delay probabilistic distribution.

In Example 93, the subject matter of Example 88 can optionally include numerically updating the one or more multipath gain estimates and the one noise precision estimate based on the one or more received observations, the estimated probabilistic distribution, and the target probabilistic distribution.

In Example 94, the subject matter of Example 93 can optionally include wherein the numerically updating the one or more multipath gain estimates and the one noise precision estimate includes numerically updating the one or more multipath gain estimates and the one noise precision estimate in order to minimize the probabilistic divergence between the estimated probabilistic destitution and the target probabilistic distribution.

In Example 95, the subject matter of Example 93 can optionally include wherein the numerically updating the one or more multipath gain estimates and the one noise precision estimate based on the one or more received observations, the estimated probabilistic distribution, and the target probabilistic distribution includes numerically updating the one or more multipath gain estimates and the one noise precision estimate based on the one or more received observations, the estimated probabilistic distribution, the target probabilistic distribution, and the one or more multipath delay estimates.

In Example 96, the subject matter of Example 93 can optionally include numerically updating one or more gain precision estimates, and wherein the numerically updating the one or more multipath gain estimates further includes numerically updating the one or more multipath gain estimates based on the one or more gain precision estimates.

In Example 97, the subject matter of Example 81 can optionally include wherein the estimated probabilistic distribution is an approximation of the target probabilistic distribution.

In Example 98, the subject matter of Example 81 can optionally include wherein the one or more received observations are based on pilot symbols received over the wireless channel.

In Example 99, the subject matter of Example 81 can optionally include wherein the processing the plurality of signals using the estimated channel impulse response includes artificially recreating the wireless channel using the plurality of signals and the estimated channel impulse response during a Virtual Drive Test.

In Example 100, the subject matter of Example 81 can optionally include wherein the processing the plurality of signals using the estimated channel impulse response includes receiving the plurality of signals over the wireless channel; and processing the plurality of received signals using the estimated channel impulse response.

Example 101 is a signal processing device. The signal processing device includes a multipath delay estimation circuit configured to numerically update a multipath delay estimate of an estimated channel impulse response of a wireless channel based on one or more observations characterizing the wireless channel, an estimated probabilistic distribution of the wireless channel, and a target probabilistic distribution of the wireless channel; and a signal processing circuit configured to process the plurality of signals using the probabilistic channel model.

In Example 102, the subject matter of Example 101 can optionally include wherein the multipath delay estimation circuit is configured to numerically update a multipath delay estimate of an estimated channel impulse response by numerically updating the multipath delay estimate based on a probabilistic divergence between the estimated probabilistic distribution and the target probabilistic distribution.

In Example 103, the subject matter of Example 102 can optionally include wherein the probabilistic divergence is a Kullback-Leibler divergence between the estimated probabilistic distribution and the target probabilistic distribution.

In Example 104, the subject matter of Example 102 can optionally include wherein the multipath delay estimation circuit is configured to numerically update the multipath delay estimate based on a probabilistic divergence by numerically updating the multipath delay estimate in order to minimize the probabilistic divergence between the estimated probabilistic distribution and the target probabilistic distribution.

In Example 105, the subject matter of Example 102 can optionally include wherein the multipath delay estimation circuit is configured to numerically update the multipath delay estimate based on a probabilistic divergence by calculating an expected value of the multipath delay estimate; numerically updating the multipath delay estimate to be the expected value of the multipath delay estimate.

In Example 106, the subject matter of Example 105 can optionally include wherein the multipath delay estimation circuit is configured to calculate an expected value of the multipath delay estimate by calculating the expected value of a mixture of von Mises probabilistic distributions.

In Example 107, the subject matter of Example 106 can optionally include wherein the multipath delay estimation circuit is configured to calculate the expected value of a mixture of von Mises probabilistic distributions by calculating the mixture of von Mises probabilistic distributions to approximate the product of a plurality of wrapped von Mises probabilistic distributions.

In Example 108, the subject matter of Example 101 can optionally include wherein the estimated channel impulse response includes one or more multipath delay estimates, one or more multipath gain estimates, and a noise precision estimate, and wherein the one or more multipath delay estimates include the multipath delay estimate.

In Example 109, the subject matter of Example 108 can optionally include wherein the multipath delay estimation circuit is configured to numerically update the multipath delay estimate by calculating an updated delay estimate as the multipath delay estimate based on the one or more received observations, the one or more multipath gain estimates, and the noise precision estimate.

In Example 110, the subject matter of Example 109 can optionally include wherein the multipath delay estimation circuit is configured to calculate an updated delay estimate as the multipath delay estimate by calculating an updated delay estimate as the multipath delay estimate based on the one or more received observations, the one or more multipath gain estimates, and the noise precision estimate in order to minimize the probabilistic divergence between the estimated probabilistic distribution and the target probabilistic distribution.

In Example 111, the subject matter of Example 110 can optionally include wherein the multipath delay estimation circuit is configured to calculate an updated delay estimate as the multipath delay estimate based on the one or more received observations, the one or more multipath gain estimates, and the noise precision estimate in order to minimize the probabilistic divergence between the estimated probabilistic distribution and the target probabilistic distribution by calculating an expected value of a multipath delay probabilistic distribution as the updated delay estimate, and further including setting the multipath delay estimate as the updated delay estimate.

In Example 112, the subject matter of Example 111 can optionally include wherein the estimated probabilistic distribution includes the multipath delay probabilistic distribution.

In Example 113, the subject matter of Example 108 can optionally include a multipath gain estimation circuit configured to numerically update the one or more multipath gain estimates based on the one or more received observations, the estimated probabilistic distribution, and the target probabilistic distribution; and a noise precision estimation circuit configured to numerically update the noise precision estimate based on the one or more received observations, the estimated probabilistic distribution, and the target probabilistic distribution.

In Example 114, the subject matter of Example 113 can optionally include wherein the multipath gain estimation circuit is configured to numerically update the one or more multipath gain estimates by numerically updating the one or more multipath gain estimates in order to minimize the probabilistic divergence between the estimated probabilistic destitution and the target probabilistic distribution, and wherein the noise precision estimation circuit is configured to numerically update the noise precision estimate by numerically updating the noise precision estimate in order to minimize the probabilistic divergence between the estimated probabilistic destitution and the target probabilistic distribution.

In Example 115, the subject matter of Example 113 can optionally include wherein the multipath gain estimation circuit is configured to numerically update the one or more multipath gain estimates by numerically updating the one or more multipath gain estimates based on the one or more received observations, the estimated probabilistic distribution, the target probabilistic distribution, and the one or more multipath delay estimates, and wherein the noise precision estimation circuit is configured to numerically update the noise precision by numerically updating the noise precision estimate based on the one or more received observations, the estimated probabilistic distribution, the target probabilistic distribution, and the one or more multipath delay estimates.

In Example 116, the subject matter of Example 113 can optionally include a gain precision estimation circuit configured to numerically update one or more gain precision estimates, and wherein the multipath gain estimation circuit is further configured to numerically update the one or more multipath gain estimates based on the one or more gain precision estimates.

In Example 117, the subject matter of Example 101 can optionally include wherein the estimated probabilistic distribution is an approximation of the target probabilistic distribution.

In Example 118, the subject matter of Example 101 can optionally include wherein the one or more received observations are based on pilot symbols received over the wireless channel.

In Example 119, 101 can optionally include wherein the signal processing circuit is configured to process the plurality of signals using the estimated channel impulse response by artificially recreating the wireless channel using the plurality of signals and the estimated channel impulse response during a Virtual Drive Test.

In Example 120, the subject matter of Example 101 can optionally include wherein the signal processing circuit is configured to process the plurality of signals using the estimated channel impulse response by receiving the plurality of signals over the wireless channel; and processing the plurality of received signals using the estimated channel impulse response.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for processing a plurality of signals, the method comprising:
   receiving one or more observations characterizing a wireless channel; wherein the one or more observations correspond to one or more Orthogonal Frequency Division Multiplexing (OFDM) pilot symbols;
   performing a channel estimation to determine a probabilistic channel model for the wireless channel, wherein the channel estimation comprises numerically updating one or more multipath gain estimates and one or more multipath delay estimates based on the one or more received observations and a probability distribution associated with the probabilistic channel model;
   determining a relative change in the multiple path gain estimates and the multipath delay estimates;
   terminating the updating when the relative change falls below a pre-determined threshold; and
   processing the plurality of signals using the probabilistic channel model.

2. The method of claim 1, wherein the probabilistic channel model is an estimated channel impulse response comprising the one or more multipath gain estimates and the one or more multipath delay estimates.

3. The method of claim 2, wherein the estimated channel impulse response comprises one or more multipath component models,
   and wherein each of the one or more multipath gain estimates and each of the multipath delay estimates are associated with a respective multipath component model of the one or more multipath component models.

4. The method of claim 1, wherein the updating the selected estimates based on the remaining non-selected estimates comprises:
   calculating an expected value of the selected estimates based on the remaining non-selected estimates.

5. The method of claim 1, wherein the probability distribution associated with the probabilistic channel model is an estimated joint probability distribution.

6. The method of claim 5, wherein the numerically updating the one or more multipath gain estimates, the one or more multipath delay estimates, and the noise precision estimate associated with the probabilistic channel model comprises:
   numerically updating the one or more multipath gain estimates, the one or more multipath delay estimates, and the noise precision estimate associated with the probabilistic channel model based on minimizing a probabilistic divergence between the estimated joint probability distribution and a joint posterior probability distribution associated with the wireless channel.

7. The method of claim 5, wherein the numerically updating the one or more multipath delay estimates comprises numerically updating the one or more multipath delay estimates based on minimizing a probabilistic divergence between the estimated joint probability distribution and a joint posterior probability distribution associated with the wireless channel.

8. A method for processing a plurality of signals, the method comprising:
   receiving one or more observations characterizing a wireless channel; wherein the one or more observations correspond to one or more Orthogonal Frequency Division Multiplexing (OFDM) pilot symbols;
   numerically updating a multipath delay estimate, a multipath gain estimate, and a noise precision estimate of an estimated channel impulse response of the wireless channel based on the one or more received observations, an estimated probabilistic distribution of the wireless channel, and a target probabilistic distribution of the wireless channel;
   determining a relative change in the multiple path gain estimate, the multipath delay estimate, and the noise precision estimate;
   terminating the updating when the relative change falls below a pre-determined threshold; and
   processing the plurality of signals using the estimated channel impulse response, wherein numerically updating the multipath delay estimate, the multipath gain estimate, and the noise precision estimate comprises selecting the one or more multipath gain estimates, the one or more multipath delay estimates, or the noise precision estimate to be updated, and updating the selected estimate based on the remaining non-selected estimates.

9. The method of claim 8, wherein the numerically updating a multipath delay estimate of an estimated channel impulse response comprises:
   numerically updating the multipath delay estimate based on a probabilistic divergence between the estimated probabilistic distribution and the target probabilistic distribution.

10. The method of claim 9, wherein the probabilistic divergence is a Kullback-Leibler divergence between the estimated joint probability distribution and a joint posterior probability distribution associated with the wireless channel.

11. The method of claim 9, wherein the numerically updating a multipath delay estimate comprises:
    calculating an expected value of the multipath delay estimate,
    numerically updating the multipath delay estimate to be the expected value of the multipath delay estimate.

12. The method of claim 11, wherein the calculating an expected value of the multipath delay estimate comprises:
    calculating the expected value of a mixture of von Mises probabilistic distributions.

13. The method of claim 12, wherein the calculating an expected value of the multipath delay estimate further comprises:
    calculating the mixture of von Mises probabilistic distributions to approximate the product of a plurality of wrapped von Mises probabilistic distributions.

14. The method of claim 8, wherein the processing the plurality of signals using the estimated channel impulse response comprises:
    artificially recreating the wireless channel using the plurality of signals and the estimated channel impulse response during a Virtual Drive Test.

15. A signal processing device comprising:
    a multipath delay estimation circuit configured to:
    numerically update a multipath delay estimate of an estimated channel impulse response of a wireless channel based on one or more observations characterizing the wireless channel, an estimated probabilistic distribution of the wireless channel, and a target probabilistic distribution of the wireless channel; wherein the one or more observations correspond to one or more Orthogonal Frequency Division Multiplexing (OFDM) pilot symbols;
    determine a relative change in the multiple path gain estimate;

terminate the update when the relative change falls below a pre-determined threshold; and a signal processing circuit configured to process the plurality of signals using the probabilistic channel model.

16. The signal processing device of claim 15, wherein the multipath delay estimation circuit is configured to numerically update a multipath delay estimate of an estimated channel impulse response by:

numerically updating the multipath delay estimate based on a probabilistic divergence between the estimated probabilistic distribution and the target probabilistic distribution.

17. The signal processing device of claim 16, wherein the multipath delay estimation circuit is configured to numerically update the multipath delay estimate based on a probabilistic divergence by:

numerically updating the multipath delay estimate in order to minimize the probabilistic divergence between the estimated probabilistic distribution and the target probabilistic distribution.

18. The signal processing device of claim 17, wherein the multipath delay estimation circuit is configured to numerically update the multipath delay estimate in order to minimize the probabilistic divergence between the estimated probabilistic distribution and the target probabilistic distribution by:

determining a mixture of von Mises probabilistic distributions to approximate the product of a plurality of wrapped von Mises probabilistic distributions;

calculating an expected value of the mixture of von Mises probabilistic distributions; and numerically updating the multipath delay estimate to be the expected value of the mixture of von Mises probabilistic distributions.

* * * * *